(12) United States Patent
Takamine

(10) Patent No.: US 7,516,102 B2
(45) Date of Patent: Apr. 7, 2009

(54) IMAGE OUTPUT TIME MANAGEMENT METHOD AND THE RECORD MEDIA

(75) Inventor: Kouichi Takamine, Hyogo-ken (JP)

(73) Assignee: Panasonic Corporation, Osaka (JP)

( * ) Notice: Subject to any disclaimer, the term of this patent is extended or adjusted under 35 U.S.C. 154(b) by 1029 days.

(21) Appl. No.: 10/043,246

(22) Filed: Jan. 14, 2002

(65) Prior Publication Data

US 2002/0163481 A1 Nov. 7, 2002

(30) Foreign Application Priority Data

Jan. 18, 2001 (JP) .............................. 2001-009779

(51) Int. Cl.
  *G06F 17/60* (2006.01)
(52) U.S. Cl. .......................................... 705/51; 705/57
(58) Field of Classification Search .................... 705/51, 705/57
  See application file for complete search history.

(56) References Cited

U.S. PATENT DOCUMENTS

| | | | |
|---|---|---|---|
| 5,629,980 A * | 5/1997 | Stefik et al. .................... | 705/54 |
| 6,754,442 B1 * | 6/2004 | Nagai et al. ................... | 386/125 |
| 2003/0004888 A1 * | 1/2003 | Kambayashi et al. .......... | 705/59 |

FOREIGN PATENT DOCUMENTS

| | | |
|---|---|---|
| JP | 10-154184 | 6/1998 |
| JP | 11-296437 | 10/1999 |
| JP | 2000-182333 | 6/2000 |
| JP | 2000-347945 | 12/2000 |
| JP | 2001245240 A * | 9/2001 |

OTHER PUBLICATIONS

Japanese Office Action, with English translation, issued in Japanese Patent Application No. JP 2002-006149, dated Jun. 6, 2008.
Japanese Decision of Refusal, w/ English translation thereof, issued in Patent Application No. JP 2002-006149 dated on Aug. 22, 2008.

* cited by examiner

*Primary Examiner*—Pierre E Elisca
(74) *Attorney, Agent, or Firm*—McDermott Will & Emery LLP

(57) ABSTRACT

The present invention relates to a technique for controlling the output of a management object data. In the past an output time of the original data can not be limited in the past. In this invention, output time of the management object data can be limited by using PC2. The PC2 is provided with time counter 208 for measuring the accumulation time for which a management object data is displayed by display 207, comparator 210 for comparing the upper limit time for which the output of the management object data is permitted and the accumulation time measured by time counter 208, and controller 205 for controlling the output of the management object data on the basis of the comparison results by comparator 208.

9 Claims, 20 Drawing Sheets

STRUCTURE OF SENDING DATA

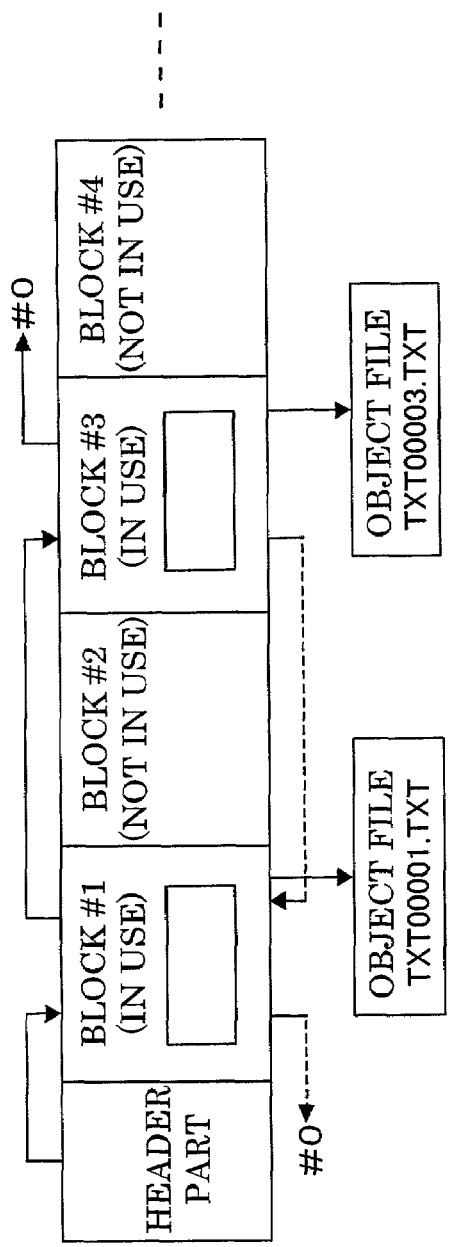
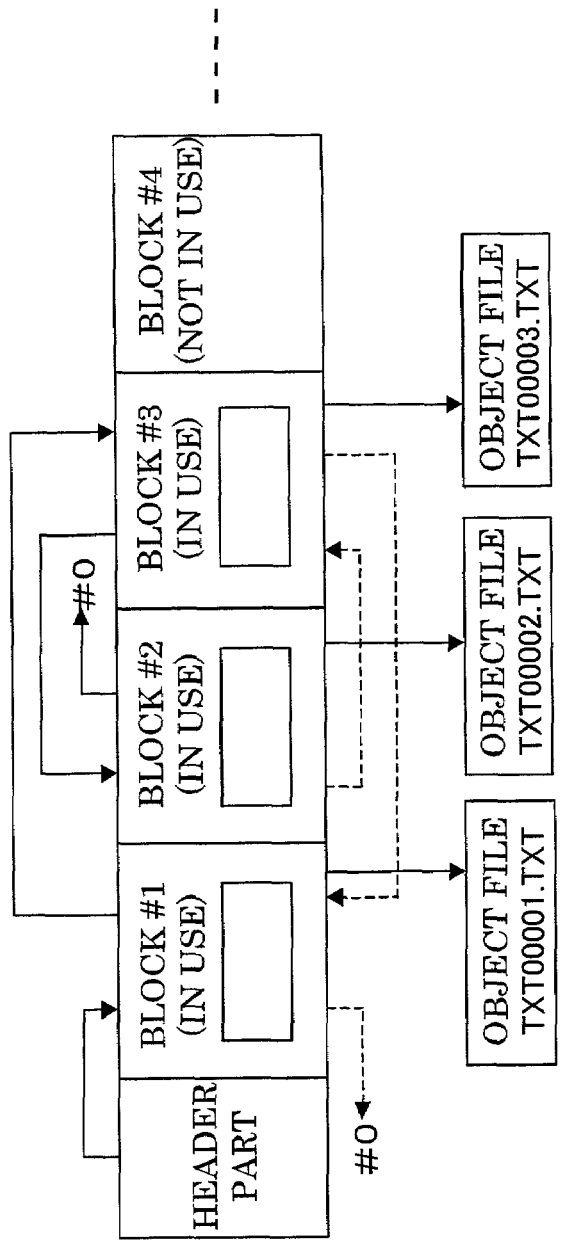
FIG. 15A
FIG. 15B

IMAGE OUTPUT TIME MANAGEMENT METHOD AND THE RECORD MEDIA

BACKGROUND OF THE INVENTION

1. Field of the Invention

The present invention relates to a technique for controlling the output of a object data on the basis of accumulation time for which the object data is outputted by output means such as display and speaker.

2. Prior Art of the Invention

With improvement in digital technology and wide spread of network in recent years, contents such as image, sound, document data (hereinafter "original data") can be instantaneously distributed to many and unspecified clients without degradation.

The client can freely see distributed original data and furthermore can copy the distributed original data on hard disk drive (HDD) and removable storage medium with little degradation.

Meanwhile, the digitized original data does not degrade in quality through many generations of copying and therefore the copy right of the original data is easy to violate as by illegal copy etc.

For example, a third party without a title can use the original data freely after the original data which is acquired via the Internet or is stored on a removable storage medium etc. was captured in personal computer etc.

To strictly protect the copy right of the original data, encrypting techniques such as CPRM (Content Protection for Recordable Media) is used in which the original data is encrypted by "encryption key" and stored on the storing medium and decoded using "decoding key." Also, mutual authentication technique is used in which kinds of copyright protection techniques mounted on the sender and receiver of the original data are mutually confirmed and "key information" etc. are exchanged. In these methods, "private duplication" of the original data is restricted and the copyright is protected.

However, even if the coding techniques such as CPRM and mutual authentication techniques are used, a third party without a title can see the original data freely as long as the third party likes after acquiring and restoring the original data by some means. In other words, the original data can be displayed for as long as one likes after the original data is restored by the third party. Therefore, it is difficult to protect the copyright of the displayed original data.

In addition to the purpose of protecting the copyright of the original data, it is desired in some cases that the display time of the original data should be limited. For example, a content provider offers services in which, using the content provider server, questions in correspondence course of education as original data are distributed to the clients. In this service, the client sees the distributed questions, writes down answers to the questions and sends them back via the network. And the contents provider marks the returned answers and judges the client's scholastic ability.

In that case, to fairly judge the client's scholastic ability, it is necessary to limit the answering time depending on the level of the client's scholastic ability. For example, if a client with a standard scholastic ability solves 5 questions, the answering time has to be limited to one hour, and if a client with an elementary level, the answering time has to be limited to one hour and 15 minutes.

However, it is difficult to limit the answering time in the past. That is because the display time of the distributed questions can not be limited. Therefore, the client can see the acquired original data as long as the client likes and it can not be known how long it took the client to answer the question, and it is impossible to fairly judge the scholastic ability of the client.

As described, the display time of the original data can not be limited in the past.

Up to now, the task has been described on the assumption that the original data is data displayed by display means. The original data can be output by sound, and in the past the output time of the original data can not be limited. Therefore, it is difficult to protect the copyright of data after the data was restored.

SUMMARY OF THE INVENTION

Accordingly, it is an object of the present invention to provide an output time management apparatus, an output time management system, and an output time management method which control the output of a object data on the basis of an accumulation time for which the object data is outputted by an output means to limit the time for which the object data is outputted. And it is an object of the present invention to provide a program to control the output of the object data.

To solve the above-mentioned problems and to achieve the foregoing objects, the output time management apparatus of the present invention is provided with time counter for measuring the accumulation time for which the object data is outputted by output means. And the output time management apparatus of the present invention is characterized in that it is provided with comparator for comparing the upper limit time for which the output of the object data is permitted and the accumulation time measured by time counter, and controller for controlling the output of the object data on the basis of the comparison results by comparator.

According to such an output time management apparatus, the output time of the object data can be limited.

The output time management system of the present invention is provided with a data sending apparatus for sending at least the object data via the network, a data receiving apparatus for receiving the object data from the data sending apparatus, and an output apparatus for outputting the object data received by the data receiving apparatus. And the output time management system of the present invention is characterized in that it is provided with a measuring apparatus for measuring the accumulation time for which the object data is outputted by the output apparatus, a comparison apparatus for comparing the upper limit time for which the output of the object data is permitted and the accumulation time measured by the measuring apparatus, and control apparatus for controlling the output of the object data on the basis of the comparison results by comparison apparatus.

According to this output time management system, output time of object data can be controlled even if object data is sent and received via the network.

Furthermore, the output time management system of the present invention comprises a storing apparatus for storing a object data and a information of an upper limit time for which the output of the object data is permitted on a time information memory, a reading apparatus for reading the object data and the upper limit time stored on the time information memory, and an output apparatus for outputting the object data read by the reading apparatus. And the output time management system of the present invention is characterized in that it comprises a measuring apparatus for measuring the accumulation time for which the object data is outputted by the output apparatus, a comparison apparatus for comparing the upper limit time read by the reading apparatus and the accumulation time measured by the measuring apparatus, and control apparatus for controlling the output of the object data on the basis of the comparison results by the comparison apparatus.

According to this output time management system, the output time of the object data can be limited even if the object data is stored on the storage means (or the removable storage medium) and the object data is read from the storage means (or the removable storage medium).

Furthermore, the output time management method of the present invention comprises a measuring step for measuring the accumulation time for which a object data is outputted by outputting means. And the output time management method of the present invention is characterized in that it comprises a comparing step for comparing the upper limit time for which the output of the object data is permitted and the accumulation time measured in the measuring step, and a controlling step for controlling the output of the object data on the basis of a comparison result in said comparing step.

According to such an output time management method, the output time of the object data can be limited.

BRIEF DESCRIPTION OF THE DRAWINGS

FIG. 15A is a diagram schematically showing a text manager file and an object text file before addition of a text data file, while FIG. 15B is a diagram schematically showing a text manager file and an object text file after addition of a text data file.

DESCRIPTION OF THE PREFERRED EMBODIMENTS

Now, the embodiments of the present invention will be explained in detail with reference to the drawings.

Embodiment 1

The arrangement of the output time management system in Embodiment 1 of the present invention will be described along with its operation.

Figure 1:
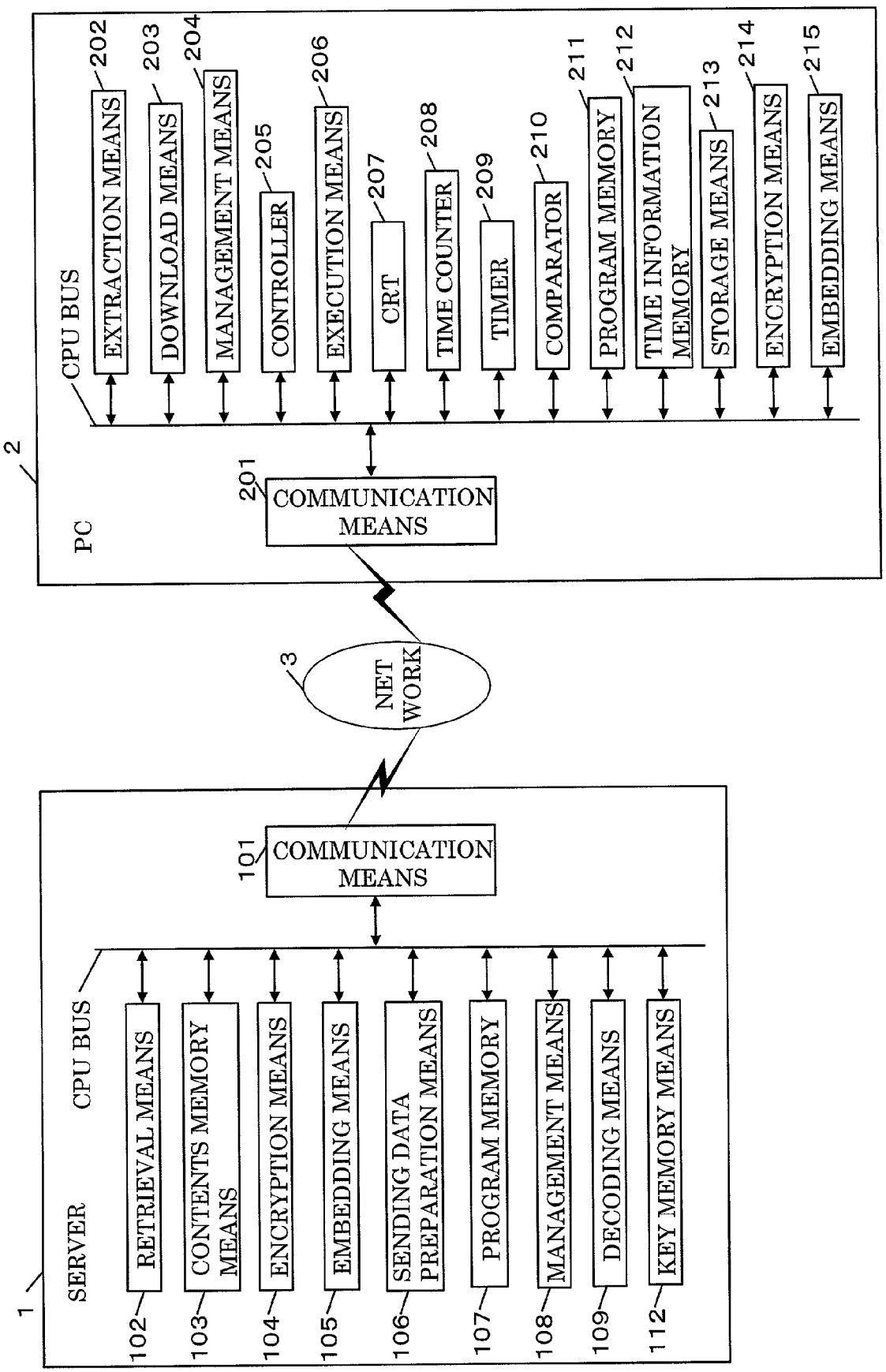
FIG. 1 is a block diagram of the output time management system of Embodiments 1 and 2 of the present invention.

FIG. 1 shows the arrangement of the output time management system in the present embodiment 1. As shown in FIG. 1, the output time management system of the present embodiment 1 is formed of server 1 to distribute a object data A and personal computer (PC) 2 that downloads the object data A from server 1 and displays it (its PC2 is an example of the output time management apparatus). Server 1 and PC 2 are connected with each other via network 3 such as local area network (LAN) or the Internet etc. (hereinafter "network").

Figure 2:
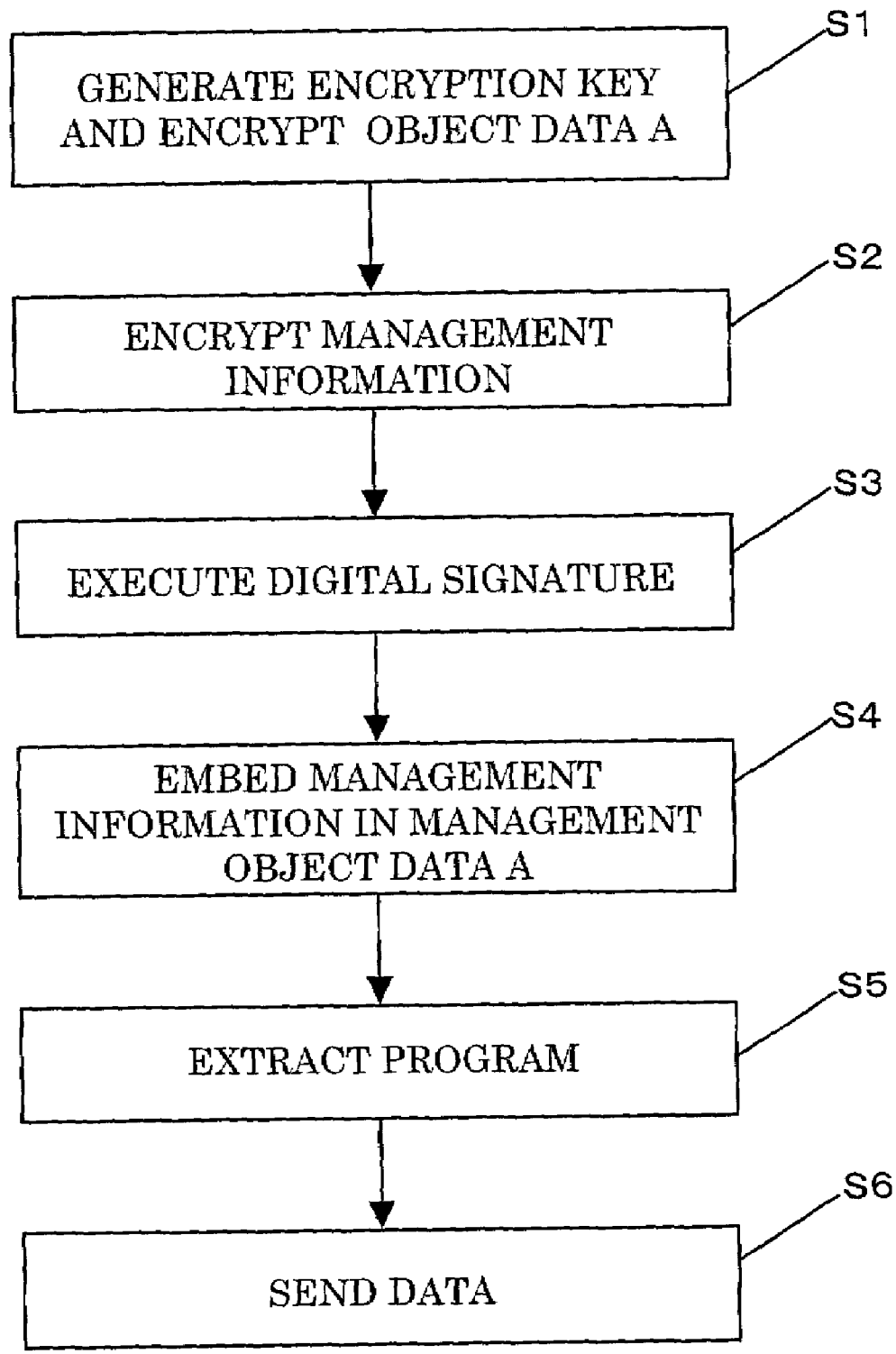
FIG. 2 is a first flow chart showing an operating procedure of the output time management system in Embodiment 1 of the present invention.
Figure 3:
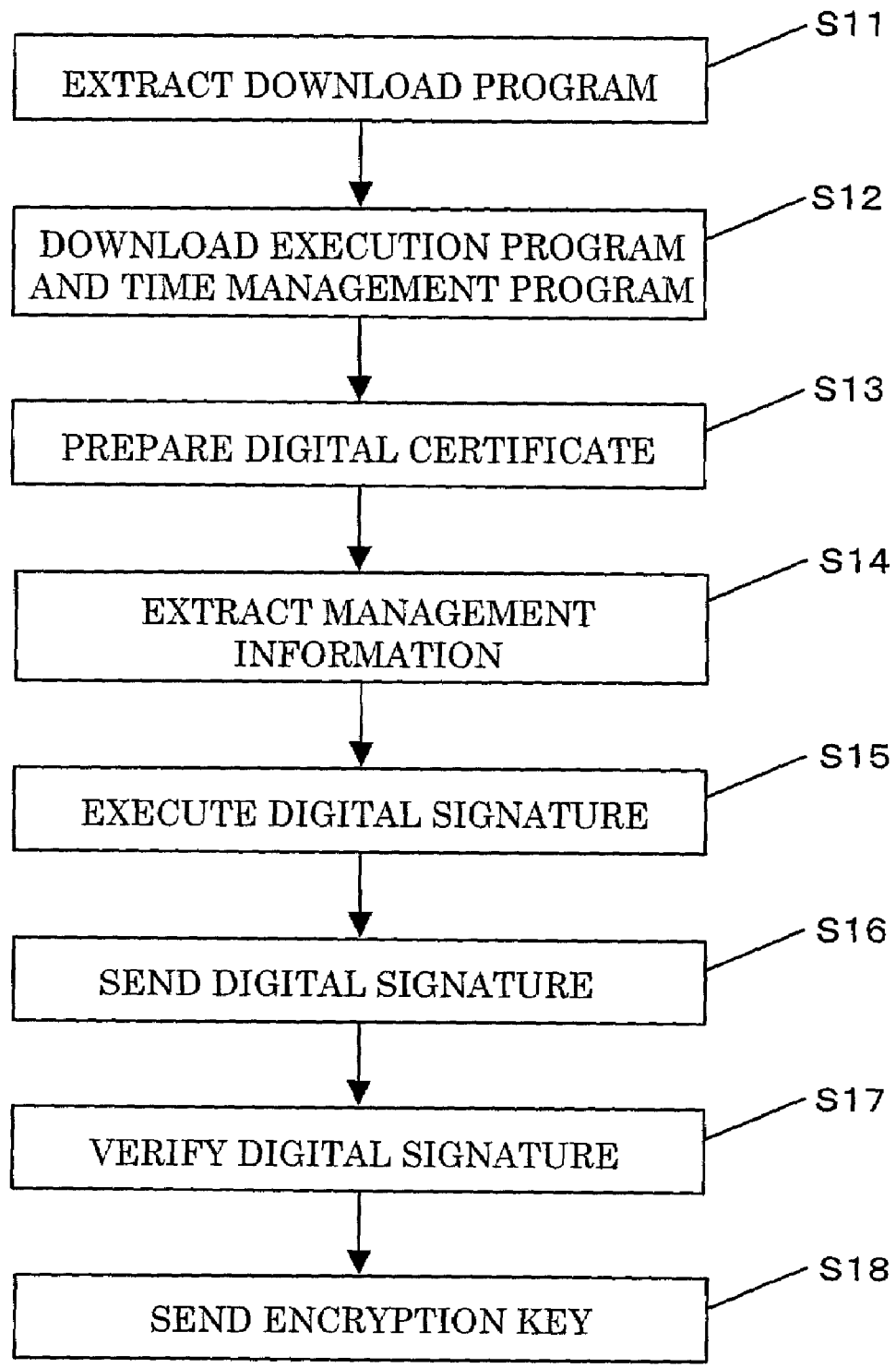
FIG. 3 is a second flow chart showing an operating procedure of the output time management system in Embodiment 1 of the present invention.
Figure 4:
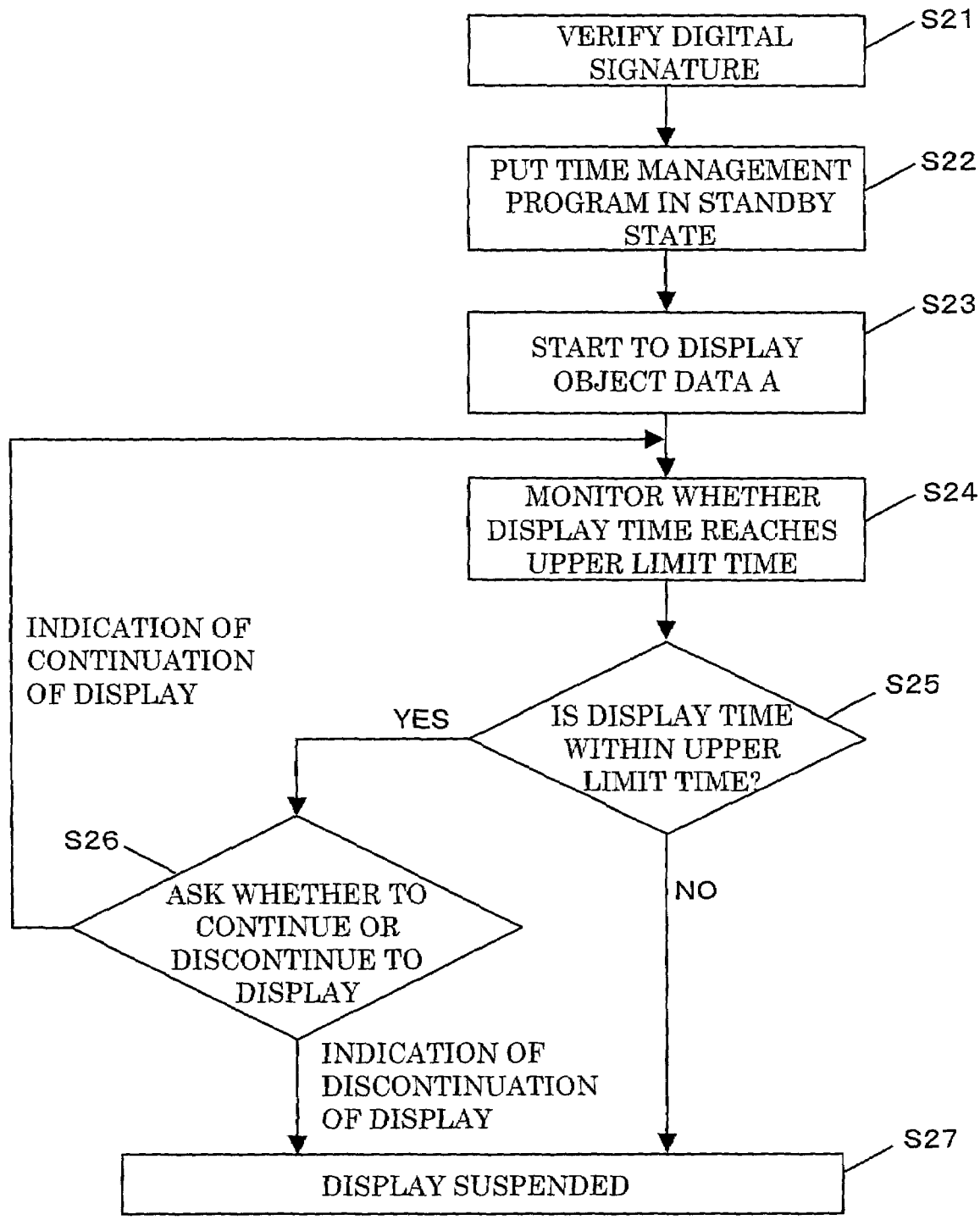
FIG. 4 is a third flow chart showing an operating procedure of the output time management system in Embodiment 1 of the present invention.

FIGS. 2 to 4 show the operating procedures of the output time management apparatus in the present embodiment 1. Now, the operation of the output time management system in Embodiment 1 will be described with reference to FIG. 1 to FIG. 4.

First, when a client using PC 2 wants to download the object data A, the client operates PC 2 accordingly. Then, communication means 201 of PC 2 sends to server 1 a use request formed of a distribution command to have the object data A distribute and an identification information to identify the object data A such as name of the object data A.

In server 1, communication means 101 receives the use request from PC2, and retrieval means 102 retrieves whether the object data A is present in contents memory means 103 on the basis of the identification information, which is included in the use request, to identify the object data $A_i$. If it is found that the object data A is present in contents memory means 103, encryption means 104 generates an encryption key of the common key encryption type to encrypt the object data A, and encrypts the object data A using its encryption key (Step 1). Along with that, encryption means 104 stores the generated encryption key in key memory means 112.

Then, encryption means 104 encrypts the management information on the object data A by using a public key of the public key encryption type of server 1; the management information comprises kind of the object data A, date and time of preparation, information on the upper limit time for which the display of the object data A is permitted (hereinafter upper limit time information B), identification number, author, the address of server 1 to distribute the object data A etc. (Step 2). Here, the description of the upper limit time will be supplemented using a concrete example. If, for example, the upper limit time is 50 hours, and when the object data A is transferred to PC2, the time for which the object data A can be displayed on the screen of CRT 207 provided in PC2 is 50 hours.

Furthermore, encryption means 104 affixes a digital signature to the management information encrypted with a public key so that the management information being distributed may not be altered (Step 3). If the result of retrieval performed by retrieval means 102 shows that the object data A is not present in contents memory means 103, retrieval means 102 has communication means 101 send PC2 information accordingly. For purpose of simplification, it is supposed that the object data A is present in contents memory means 103 in the present embodiment 1.

Now, embedding means 105 embeds the following information in the object data A encrypted by encryption means 104 by an digital watermark method so that a third party can not detect them: said information comprises the encrypted management information, digital signature, and digital certificate of server 1 (Step 4). In the following description, the encrypted management information, digital signature and digital certificate of server 1 may be regarded as digital watermark information in some cases.

And sending data preparation means 106 extracts an execution program, which is program for taking out and interpreting the digital watermark information embedded as described above and for executing specific items contained in the digital watermark information, from program memory 107 (Step 5). Sending data preparation means 106 extracts from program memory 107 a time control program to control the display time of the object data A after sending.

Figure 5:
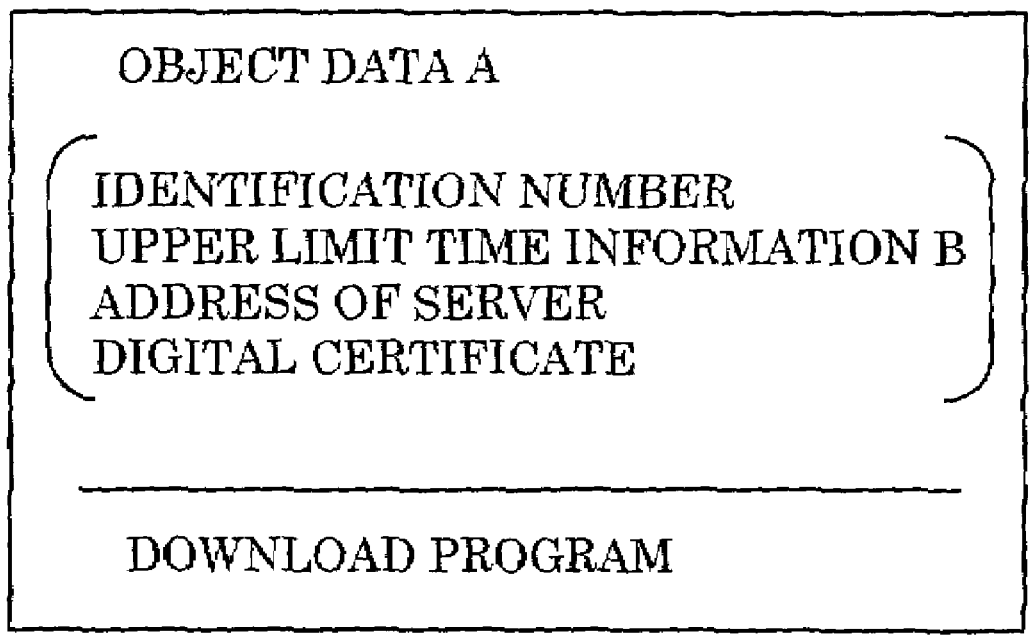
FIG. 5 is a block diagram of sending data in Embodiment 1 of the present invention.

After that, sending data preparation means 106 prepares a download program for PC2 to download the execution program and the time control program, and adds the download program to the object data A in which the digital watermark information is embedded and which is encrypted, then prepare sending data as shown in FIG. 5. Then, communication means 101 sends the sending data to PC2 (Step 6).

Now, there will be explained a technique for embedding digital watermark performed by embedding means 105.

The digital watermark technique is a technique for embedding and hiding specific information (such as copyright information, limiting information on copy etc., signature, logo mark etc.) in multimedia data including image, sound etc. There are two kinds of digital watermark, one in which embedded information can be seen and, the other in which embedded information can not be seen. And as to the other, it is difficult to detect embedded information visibly and aurally, and the embedded information is hidden.

The digital watermark technique is used in such applications as:

(1) To store copyright information, that is, the intrinsic purpose of the technique (2) To trace an illegal copier by using distribution destination of image etc. included in the watermark information, if illegal copying is done (3) To prevent illegal copying by copy protection embed in the watermark.

In present embodiment 1, embedding means 105 embeds the management information including the upper limit time information B in the encrypted object data A using the latter kind of technique for embedding invisible watermark.

Meanwhile, there are two methods of the technique for embedding watermark information (for example, the management information) in the original signal (for example, the object data A): one in which the watermark information is directly embedded and the other in which the original signal is converted into a frequency component and then a signal is generated by reversibly converting the frequency component embedded the watermark information.

Figure 6:
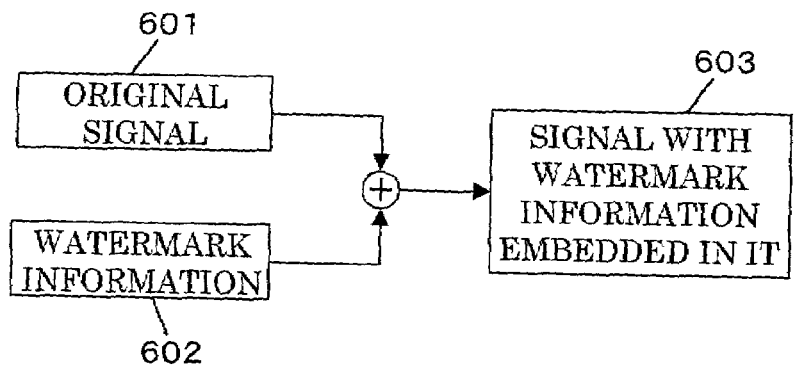
FIG. 6 is a block diagram explaining a system of directly embedding a watermark information in an original signal.

Next, there will be explained the above-mentioned two methods with reference to FIG. 6 and FIG. 7. FIG. 6 is a block diagram to explain the method of directly embedding watermark in the original signal. In the directly embedding method, original signal 601 and watermark information 602 are directly added together to generate signal 603 with watermark information embedded in it as shown in FIG. 6. This method is suitable for applications where the watermark information has to be detected real-time since generating operation of a signal with watermark information embedded in it is light. But its shortcoming is that the embedded watermark information is easily removed as compared with the method in which the watermark information is embedded in the frequency component which will be described later.

Figure 7:
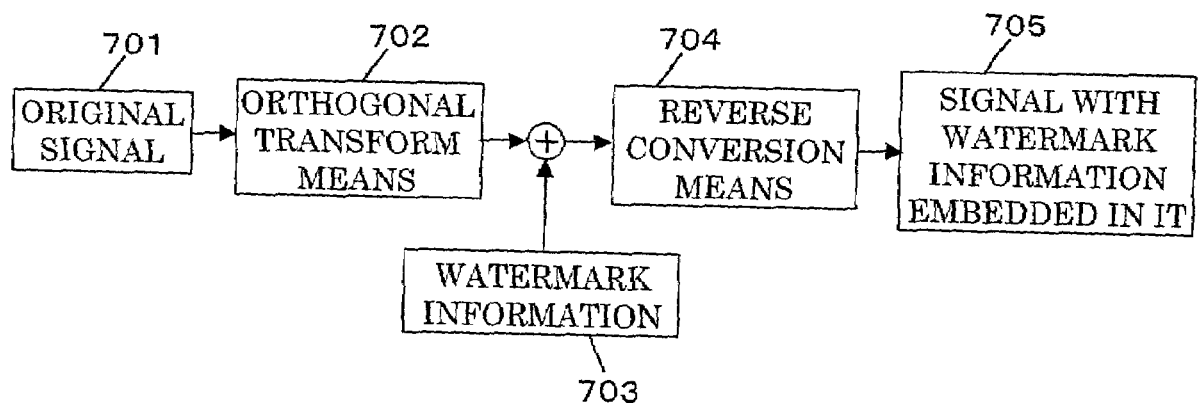
FIG. 7 is a block diagram explaining a system of embedding a watermark information in a component of a specific frequency after converting the original signal into the frequency component.

FIG. 7 is a block diagram to explain the method in which the original signal is transformed into a frequency component by fast fourier transform (FFT) etc. and then the watermark information is embedded in a specific frequency component. In the method in which the original signal is transformed in the frequency component and then the watermark is embedded, as shown in FIG. 7, original signal 701 is subjected to frequency transform such as FFT by orthogonal transform means 702. And the output from orthogonal transform means 702 and watermark information 703 are added together and then is subjected to FFT reverse transform by reverse conversion means 704 and signal 705 with watermark information embedded in it is generated.

In addition to FFT, there is a method in which the signal is transformed into a frequency component, that is, discrete cosine transform (DCT) which is orthogonal transform method adopted in international standards on image compression MPEG and JPEG.

Now, if the sending data is sent from server 1 to PC 2, communication means 201 receives the sending data in PC 2. Then, extraction means 202 takes out a download program from the sending data (Step 11). Since the download program is a program merely added to the encrypted object data A, extraction means 202 can take out a download program without difficulty. It is desirable that the download program is described in the intermediate language form having a function to execute an intermediate language program like JAVA which does not depend on the type of hardware to execute the download program. And the object data A is stored in storage means 213.

Next, download means 203 downloads the execution program and the time control program from server 1 utilizing the download program taken out (Step 12). Those downloaded execution program and time control program are stored in program memory 211.

Then, management means 204 generates a pair of keys, that is, public and secret keys of the client in the public key encryption formula, using the downloaded execution program, and prepares a digital certificate of the self signature style signed by the secret key of the client himself or herself (Step 13).

And management means 204 takes out the management information and the digital signature embedded by digital watermark method from encrypted object data A using the execution program (Step 14).

Furthermore, by the public key of the public key encryption formula of server 1 contained in the digital certificate in the management information taken out, management means 204 decodes the kind of the encrypted object data A, date and time of preparation, upper limit time information B, identification number, author etc. and digital signature in the management information taken out and verifies them. And if the verification results are correct, management means 204 affixes a digital signature by the secret key of the client's public key encryption formula to information such as the kind of the encrypted object data A, date and time of preparation, and the upper time information B etc., and to the client's name, and to the prepared digital certificate of the self signature type (Step 15). Management means 204 stores the upper limit time information B in time information memory 212.

Then, communication means 201 sends to server 1 the signature-affixed information, for example, the kind of the object data A, date and time of preparation, the upper limit time information B etc., the client's name, digital certificate of the self signature style via network 3 (Step 16).

The sent information is received by communication means 101 in server 1, and management means 108 of server 1 verifies the digital signature in the received information by using the public key of the client's public key encryption formula contained in the digital certificate of the self-signature type in the received information (Step 17).

If the verification results of the digital signature are correct, decoding means 109 takes out the management information on the encrypted object data A out of the information sent from PC 2, and decodes it by the secret key of the public key encryption formula of server 1.

And management means 108 verifies decoded management information such as the kind of the object data A, date and time of preparation, the time control information etc. and if the results are correct, management means 108 takes out an encrypted key from key memory means 112 which is used in encrypting the object data A and stored in key memory means 112.

Then, encryption means 104 encrypts the encryption key taken out from key memory mean 112 by the public key of the client's public key encryption formula contained in the client's self signature style digital certificate in information from PC 2 received by communication means 101 and then affixes digital signature. And communication means 101 sends to PC 2 the encryption key encrypted by the client's public key via network (Step 18).

In PC 2, communication means 201 receives the encryption key encrypted by the client's public key sent from server 1, and management means 204 decodes the encrypted key by using a secret key of the client's public key encryption formula and verifies the digital signature (Step 21), and controller 205 puts the downloaded time management program in a standby state (Step 22).

And if management means 204 finds that the verification results of the digital signature are correct, execution means 206 restores the object data A stored in storage means 213 using the encryption key decoded by management means 204 and starts to display the object data A on the screen of CRT 207 as display means (Step 23).

At the same time as the object data A starts to be displayed on the screen of CRT 207, controller 205 activates the time management program. On the basis of the time management program, time counter 208 uses the time counted by timer 209 and starts to measure the time for which the object data A is displayed on CRT 207. At the same time, comparator 210 starts to compare the upper limit time and the accumulation time measured by time counter 208, and controller 205 monitors whether the accumulation time measured by time counter 208 reaches the upper limit time (Step 24).

If the comparison results by comparator 210 show that the accumulation time measured by time counter 208 is within the upper limit time (Step 25), controller 205 continues to display the object data A on CRT 207, and displays a message asking the user whether to continue or discontinue the display of the object data A on CRT 207 (Step 26). If the user chooses to suspend the display as to the message and operates PC 2 accordingly, controller 205 suspends the display of the object data A on CRT 207, and time counter 208 ends measuring the time of display of the object data A on CRT (Step 26). Furthermore, comparator 210 deducts the accumulation time measured by time counter 208 from the upper limit time, and renews the upper limit time. On the other hand, if the user chooses to continue to display or does not choose either, controller 205 continues to display the object data A on CRT 207. And the process returns to the step of monitoring whether the accumulation time measured by time counter 208 reaches the upper limit time (Step 24).

On the other hand, if comparison results by comparator 210 indicate that the accumulation time measured by time counter 208 reaches the upper limit time (Step 25), controller 205 forcibly suspends the display of the object data A on CRT 207 (Step 27). At the same time, controller 205 erases the object data A from storage means 213.

As mentioned above, the output time management system of the present embodiment 1 can limit the display time of the object data A. As a result, even if a third party without a title can restore the object data A by illegal means, the copyright of the object data A can be protected more strictly than before by limiting the display time of the object data A.

In the above-mentioned embodiment, in case the accumulation time measured by time counter 208 is within the upper limit time, a message is to be displayed on the display screen of CRT 207 in which the user is asked to choose to continue or discontinue to display the object data A on CRT 207. Then, if the user chooses to discontinue to display, controller 205 discontinues the display of the object data A on CRT 207. However, if the user operates so PC 2 as to display the object data A on the screen of CRT 207, the object data A can be displayed within the limits of the renewed upper limit time. In other words, the object data A can be displayed within the limits of the initial upper limit time of the upper limit time information B sent from server 1.

In the above-mentioned embodiment, furthermore, time counter 208 is measures the time for which the object data A is displayed on CRT 207, utilizing the time counted by timer 209. However, in case PC 2 is constantly in contact with server 1, for example, communication means 201 of PC 2 acquires time information from outside via network 3 (in this case, communication means 201 functions as time information acquiring means) and time counter 208 may measure the time for which the object data A is displayed on CRT 207 utilizing the time information from outside. Here, in case communication means 201 acquires time information from outside, communication means 201 may acquire time information from a predetermined server connected with network 3. Then, furthermore, a program let communication means 201 acquire time information from the predetermined server may be incorporated in PC 2 and on the basis of the program, communication means 201 may acquire time information from outside.

While no reference was made in the above-mentioned embodiment, server 1 may send to PC 2 information to erase or change the upper limit time after sending to PC 2 the object data A. Then, communication means 201 of PC 2 receives the information to erase or change the upper limit time. If the information is to erase the upper limit time, controller 205 outputs the object data A on the basis of the client's direction in spite of the accumulation time measured by time counter 208. On the other hand, when communication means 201 receives information to change the upper limit time, controller 205 monitors whether the accumulation time measured by time counter 208 reaches the changed upper limit time. Incidentally, it is desirable that information to erase or change the upper limit time should be sent after being encrypted using the encryption technique described in Embodiment 1.

Concrete examples of the upper limit times will be explained with reference to Table 1.

TABLE 1

| Rank | Upper limit time |
|---|---|
| A | without limit |
| B | 56 hours |
| C | 28 hours |
| D | 14 hours |
| E | 2 hours |

Rank A shown in Table 1 is a level at which the object data A can be displayed without limit and is applicable in such a case where the client fully buys up and sees the object data A. In Rank B to E shown in Table 1, on the other hand, the display limit time is set for each rank, and the ranks are so set that the longer the limit time is, the higher the download fee for the object data A is. However, the download fee for Rank B, the longest upper limit time, is set low as compared with the download fee for Rank A in which the object data A is fully bought up.

In the above-mentioned embodiment 1, furthermore, the object data A is data to be displayed, but the object data A may be data audibly outputted. In such a case, too, the output time can be limited by utilizing the upper limit time as in the case where the object data A is data to be displayed. If the object data A is data to be audibly outputted, the data is outputted as sound by sound output means such as speaker and earphone. In the following embodiment, too, the object data A may be data to be audibly outputted.

In the above-mentioned embodiment, PC 2 manages the output time of the object data A and if the output time reaches the upper limit time, the output of the object data A is suspended and erased. However, if server 1 and PC 2 are constantly in contact with each other, server 1 may manage the output time of the object data A instead of PC. In that case, it is necessary that server 1 is provided with the same functions as controller 205, time counter 208, and comparator 210 provided in PC 2.

Figure 18:
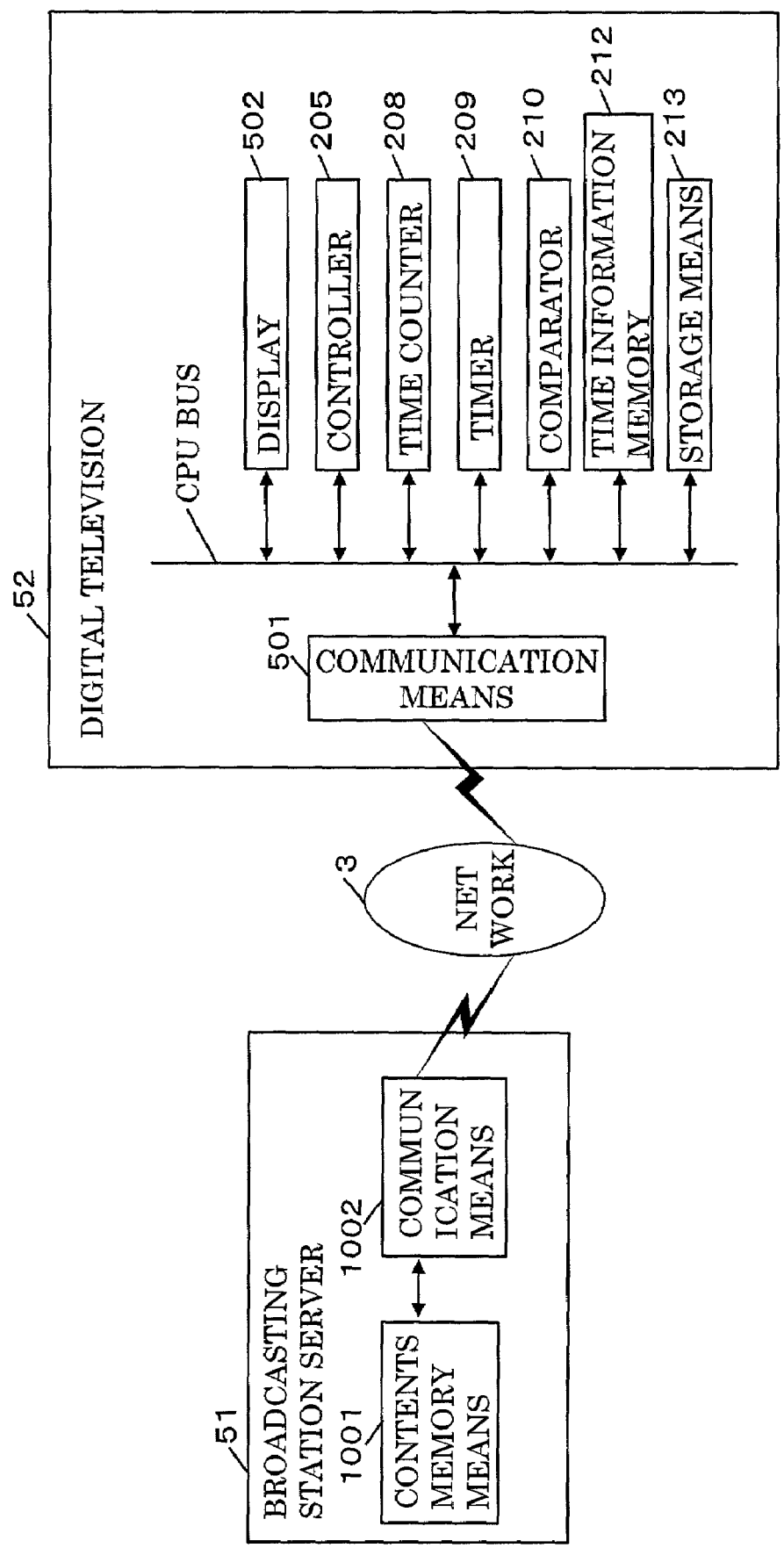
FIG. 18 is a block diagram of the output time management system of the present invention.

In the above-mentioned embodiment 1, furthermore, the output time management system is formed of server 1 and PC 2. As shown in FIG. 18, the output time management system may be formed of broadcasting station server 51 instead of server 1 and digital television 52 in place of PC 2.

In this case, server 1 sends the object data A to PC 2, while broadcasting station server 51 sends to digital television 52 data for broadcasting as the object data A (for example, two-hour movie). And in digital television 52, the data for broadcasting is stored in storage means 213.

Next, when the data for broadcasting is displayed on display 502 by the user's instructions, time counter 208 measures the display time for which the data for broadcasting is displayed, and the display time measured by comparator 210 is compared with the upper limit time (for example, two hours and a half) for which the display for the data for broadcasting is permitted. If the comparison shows that the display time reaches the upper limit time, controller 205 suspends the display on display 502. Furthermore, controller 205 suspends the display and also erases the data from storage means 213.

It is not limited that the data for broadcasting is stored in storage means 213. Furthermore, in case digital television 52 acquires the data for broadcasting specific portions by specific portions from broadcasting station server 51 according to the user's instructions without storing the data for broadcasting in storage means 213, broadcasting station server 51 may control the output time (display time) for which the data for broadcasting is outputted by display 502 of digital television 52.

The terminal to receive data sent from broadcasting station server 51 is not limited to the digital television 52. As the terminal, it is possible to use STB (set top box), PDA (personal digital assistance) etc. that can control the output of data for broadcasting on the basis of the output time of the data for broadcasting in the same way as the digital television 52.

Embodiment 2

In Embodiment 2, it is supposed that the object data A is a question in correspondence course and it will be described how the questions in correspondence course are displayed. And it is supposed that the question in correspondence course is data to which the client (in this case, the answerer), the user of PC 2, can write down an answer of the above question. And the present embodiment 2 will be explained with such a case as a following example, the client sees a displayed question in the correspondence course and the client give an answer to the above question within a time limit, for example one hour.

Figure 8:
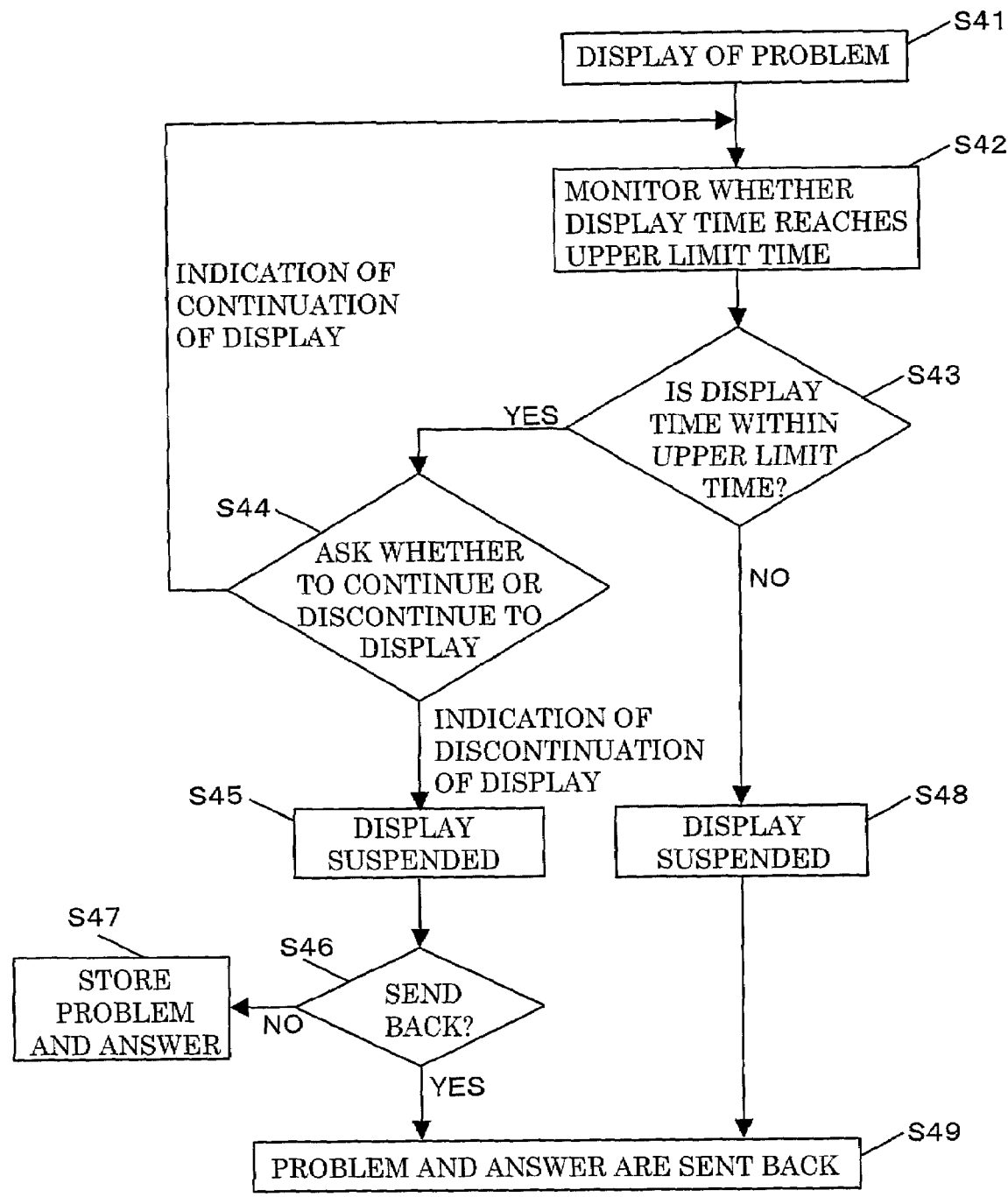
FIG. 8 a flow chart showing an operating procedure of the output time management system in Embodiment 2 of the present invention.

Like that, the feature of Embodiment 2 is that the object data A in Embodiment 1 is specified as question of correspondence course of education, and Embodiment 2 will be explained in the manner of supplementing Embodiment 1. Therefore, FIG. 1 is used in explaining Embodiment 2. In Embodiment 2, furthermore, the operation of the output time management system after the question in correspondence course is sent will be explained. Furthermore, the operation of the output time management system in Embodiment 2 will be explained with reference to FIG. 8 too.

Now, if the question in correspondence course is sent from server 1, execution means 206 restores the question in correspondence course using an encryption key encrypted by management means 204 in advance, and starts to display the question in correspondence course on the screen of CRT 207 (Step 41).

At the same time as the question in correspondence course starts to be displayed on the screen of CRT 207, controller 205 operates the time management program described in Embodiment 1. On the basis of the time management program, time counter 208 starts to measure the time for which the question in correspondence course is displayed utilizing the time to be counted by timer 209. At the same time, comparator 210 starts to compare the upper limit time for which the display of the question in correspondence course on CRT 207 is permitted (the upper limit time is one hour, for example and corresponds to the answering limit time) and the accumulation time measured by time counter 208. Controller 205 monitors whether the accumulation time measured by time counter 208 reaches the upper limit time (Step 42).

If the comparison results by comparator 210 indicate that the accumulation time measured by time counter 208 is within the upper limit time (Step 43), controller 205 continues the display of the question in correspondence course on CRT 207. At the same time, controller 205 displays a message on CRT 207 asking the user to choose whether to continue or discontinue the display of the question in correspondence course on the display screen of CRT 207 (Step 44).

If, to the message, the user chooses to discontinue the display and operates PC 2 accordingly, controller 205 suspends the display of the question in correspondence course on CRT 207, and at the same time, time counter 208 ends the counting of the time for which the question in correspondence course is displayed on CRT 207 (Step 45). And comparator 210 deducts the accumulation time measured by time counter 208 from the upper limit time and renews the upper limit time.

Furthermore, controller 205 displays a message on the screen of CRT 207 asking the client whether to return to server 1 the answer given by the client to the question in correspondence course or not at the time when the display of the question in correspondence course is stopped. If the client indicates an intention to return in reply to the message (Step 46), the question and the answer at the time when the display of the question in correspondence course is suspended are returned to server 1 after being encrypted as will be described later (Step 49). On the other hand, if the client does not indicate an intention to return, the question and the answer at the time when the display of the question in correspondence course is suspended is stored in storage means 213 within PC 2 (Step 47).

When a message asking the user to choose whether to continue or discontinue the display of the question in correspondence course is displayed on CRT 207, if the user chooses to continue the display or does not choose either, controller 205 continues the display of the question in correspondence course on CRT 207. And the process returns to the step whether the accumulation time measured by time counter 208 reaches the upper limit time (Step 42).

Meanwhile, if the comparison results by comparator 210 show that the accumulation time measured by time counter 208 reaches the upper limit time (Step 43), controller 205 forcibly suspends the display of the question in correspondence course on CRT 207 (Step 48). At the same time, controller 205 stores the answer given by the client to the question in correspondence course in storage means 213.

And if the client indicates an intention to return or if the accumulation time measured by time counter 208 reaches the upper limit time, encryption means 214 encrypts the question and the answer stored in the storage means 213. Next, encryption means 214 encrypts a management information on the encrypted question and answer by encryption key of the client's public encryption formula. After that, management means 204 affixes digital signature to the encrypted management information.

Then, embedding means 215 embeds the encrypted management information, the digital signature and the client's digital certificate in the encrypted question and answer by digital watermark method described in Embodiment 1.

And communication means 201 sends back to server 1 the question and answer with the management information etc. embedded in them (Step 49).

In the above example, the upper limit time (answering limit time) for which the display of the question in correspondence course on CRT 207 permitted is set at one hour, but the upper limit time may be decided on by the levels of clients registered in advance. Table 2 shows an example of rank, the client's levels and the upper limit times (answering time limit).

TABLE 2

| Rank | Client's level | Upper limit time (answering time limit) |
| --- | --- | --- |
| A | — | unlimited |
| B | beginner's level | 2 hours |
| C | intermediate level | one hour and 15 minutes |
| D | ordinary level | one hour |
| E | advanced level | 50 minutes |

Rank A in Table 2 is a level without time limit. No limit is set on the time it takes the client to answer the question. It corresponds to that the client solves a collection of questions like a drill. If the client chooses Rank A, the client can learn the distributed question repeatedly. Rank B in Table 2 is for a client with the beginner's level of scholastic ability to solve a question, and the upper limit time (answering time limit) is set longer than that for Rank C to Rank E. The upper limit time (answering time limit) set in Rank C in Table 2 is set shorter than that for Rank B and longer than that for Rank D. The upper limit time (answering time limit) set in Rank D in Table 2 is a standard time it takes a client with a standard level of scholastic ability to solve. The upper limit time (answering time limit) set in Rank E in Table 2 is a time it takes a client with an advanced level to solve a question.

The upper limit time (answering time limit) is different depending on the degree of difficulty of a distributed question.

As set forth above, the output time management system in Embodiment 2 can limit the display time of a question in correspondence course. As a result, the scholastic ability of the client can be judged appropriately.

Embodiment 3

Next, the arrangement of the output time management system in Embodiment 3 will be explained along with its operation.

Figure 9:
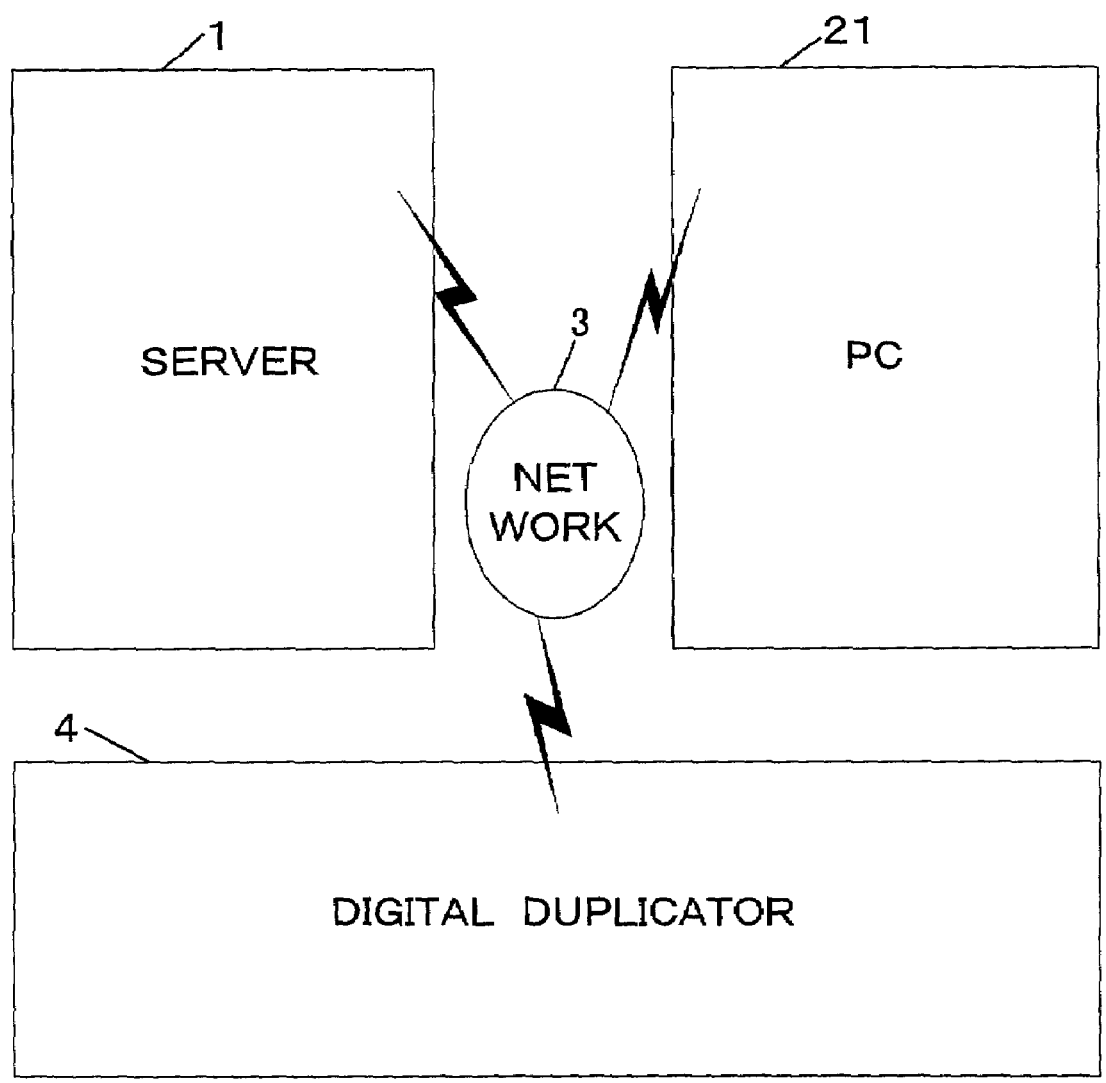
FIG. 9 is a block diagram of the output time management system in Embodiment 3 of the present invention.
Figure 19:
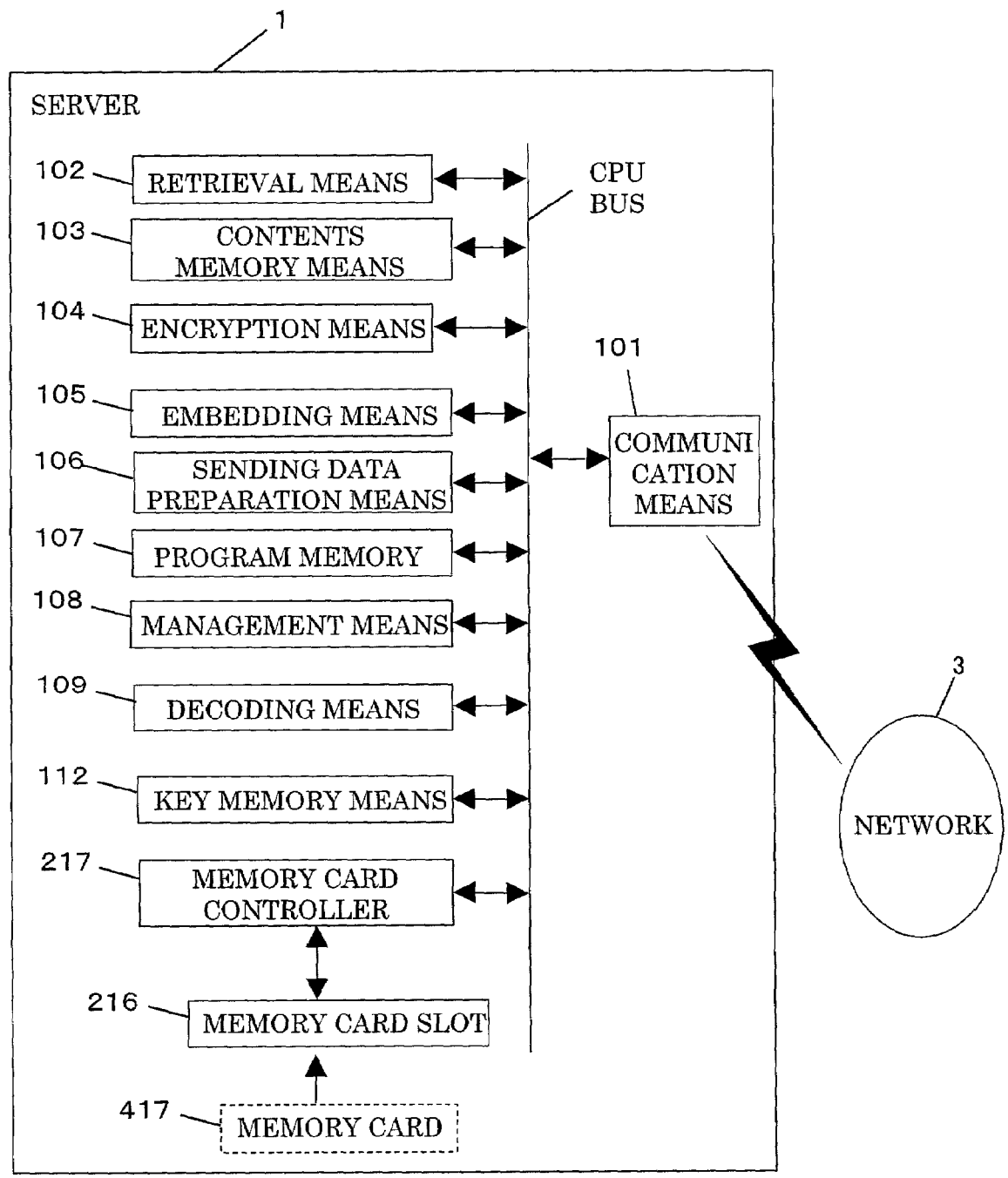
FIG. 19 is a block diagram of server 1 of the output time management system in embodiment 3 of the present invention.
Figure 20:
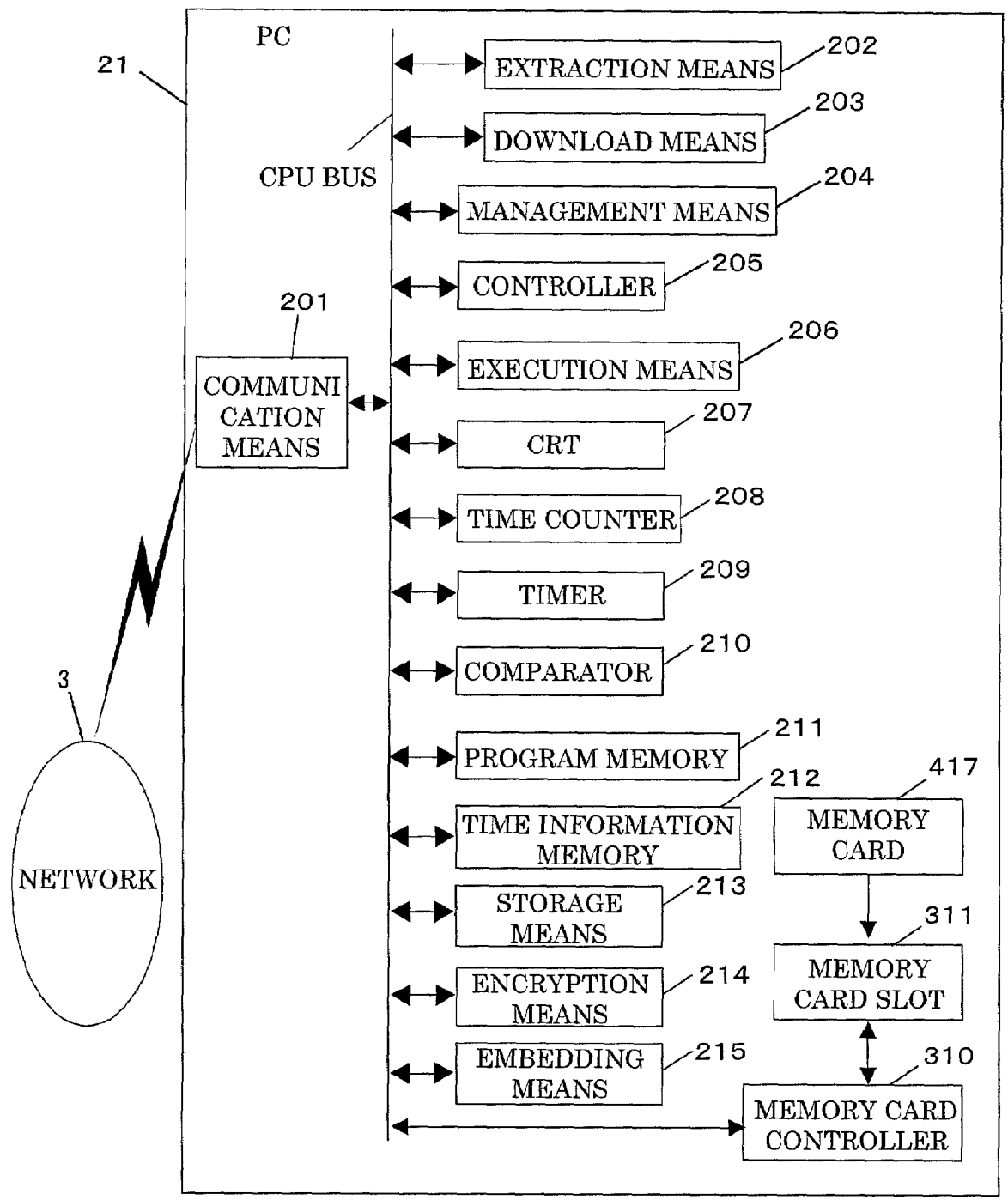
FIG. 20 is a block diagram of PC21 of the output time management system in Embodiment 3 of the present invention.
Figure 21:
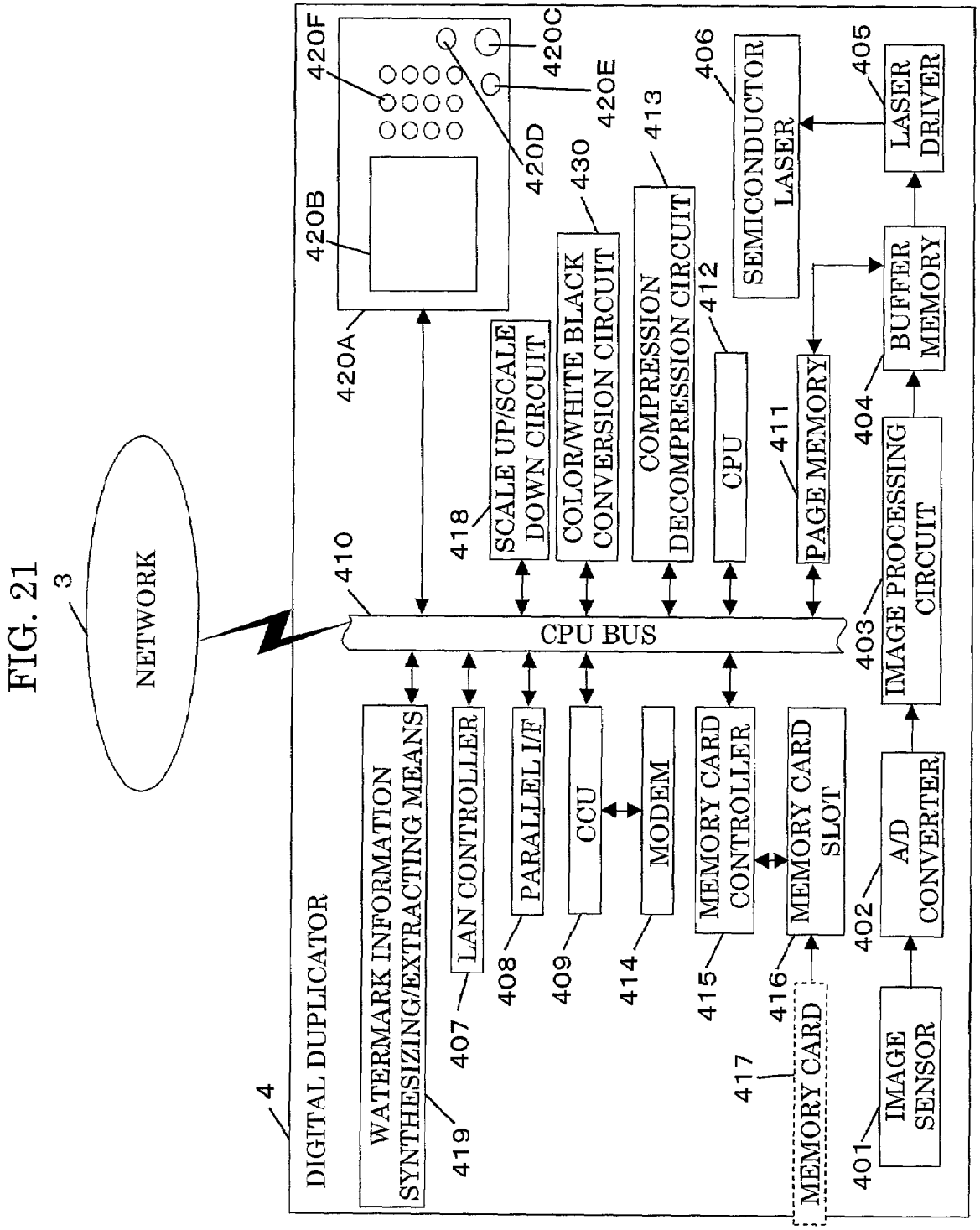
FIG. 21 is a block diagram of digital duplicator 4 of the output time management system in Embodiment 3 of the present invention.

FIG. 9 shows a rough arrangement of the output time management system in Embodiment 3. FIG. 19, FIG. 20, and FIG. 21 show arrangements of server 1, PC 21 and digital duplicator 4 which make up the output time management system in Embodiment 3. As shown in FIG. 9, FIG. 19, FIG. 20 and FIG. 21, the output time management system in Embodiment 3 is made up of server 1 to distribute a object data A, digital duplicator 4 (an example of a storing apparatus) that can download the object data A from server 1 and store the object data A on memory card 417 (an example of a removable storage medium), and PC 21 (an example of the output time management apparatus) that reads the object data A stored on memory card 417 and display it. And it is supposed that server 1, digital duplicator 4 and PC 21 are connected via network 3.

Here, digital duplicator 4 will be explained briefly. Digital duplicator 4 flashes light on a document placed in a specific position and obtains image signals by using the reflected light from the document and then copies the document on recording paper on the basis of the image signals. And digital duplicator 4 is provided with LAN controller 407 as communication means in addition to the copying function. Furthermore, digital duplicator 4 is characterized in that it has a function of storing the object data A received from server 1 by LAN controller 407 on the memory card 417.

Next, PC 21 has a function of reading the object data A stored on the memory card 417 in addition to the respective means which PC 2 has as described in Embodiment 1. And as PC 2 in Embodiment 1 limits the display time of the object data A, PC 21 in Embodiment 3 limits the display time of the object data A. PC 21 in Embodiment 3 is connected with server 1 and digital duplicator 4 via network 3. For purpose of simplicity, it is supposed that PC 21 in Embodiment 3 reads the object data A off-line and limits the display time of the object data A off-line.

The copying function of digital duplicator 4 will be further explained with reference to FIG. 21. As shown in FIG. 21, image sensor 401 converts the reflected light from the document by scanning the document into an electric signal, and A/D converter 402 converts the electric signals into digital image signal. Its digital image signal is subjected to image processing and edit processing such as edge emphasized, trimming and half-tone processing in image processing circuit 403. The image signal from image processing circuit 403 is buffered by buffer memory 404 so as to adjust the speed when the signal is outputted to laser driver 405. Laser driver 405 drives semiconductor laser 406 and an electrostatic latent image is formed on the drum by laser beam outputted from semiconductor laser 406.

Buffer memory 404 is connected with page memory 411. Also, page memory 411, CPU 412, LAN controller 407, parallel I/F 408, CCU (communication control unit) 409, compression decompression circuit 413 and memory card controller 415 are connected with each other via CPU bus 410.

CPU 412 is provided with RAM and ROM and controls the whole of digital duplicator 4. Page memory 411 has a capacity for storing at least one page of image data. Image data stored in page memory 411 is outputted to laser driver 405 via buffer memory 404 and recorded on recording paper.

Next, the data receiving function and data storing function of digital duplicator 4 will be explained with reference to FIG. 21.

LAN controller 407 downloads the object data A distributed from server 1 via network 3. The download operation is the same as the operation when PC 2 downloads the object data A from server 1 in the above-mentioned embodiment 1. And the downloaded object data A, management information, execution program and time management program are stored in memory card 417 (an example of removable storage medium) by memory card controller 415. There will be explained the operation of downloading the object data A and the operation of storing the object data A on memory card 417.

Figure 10:
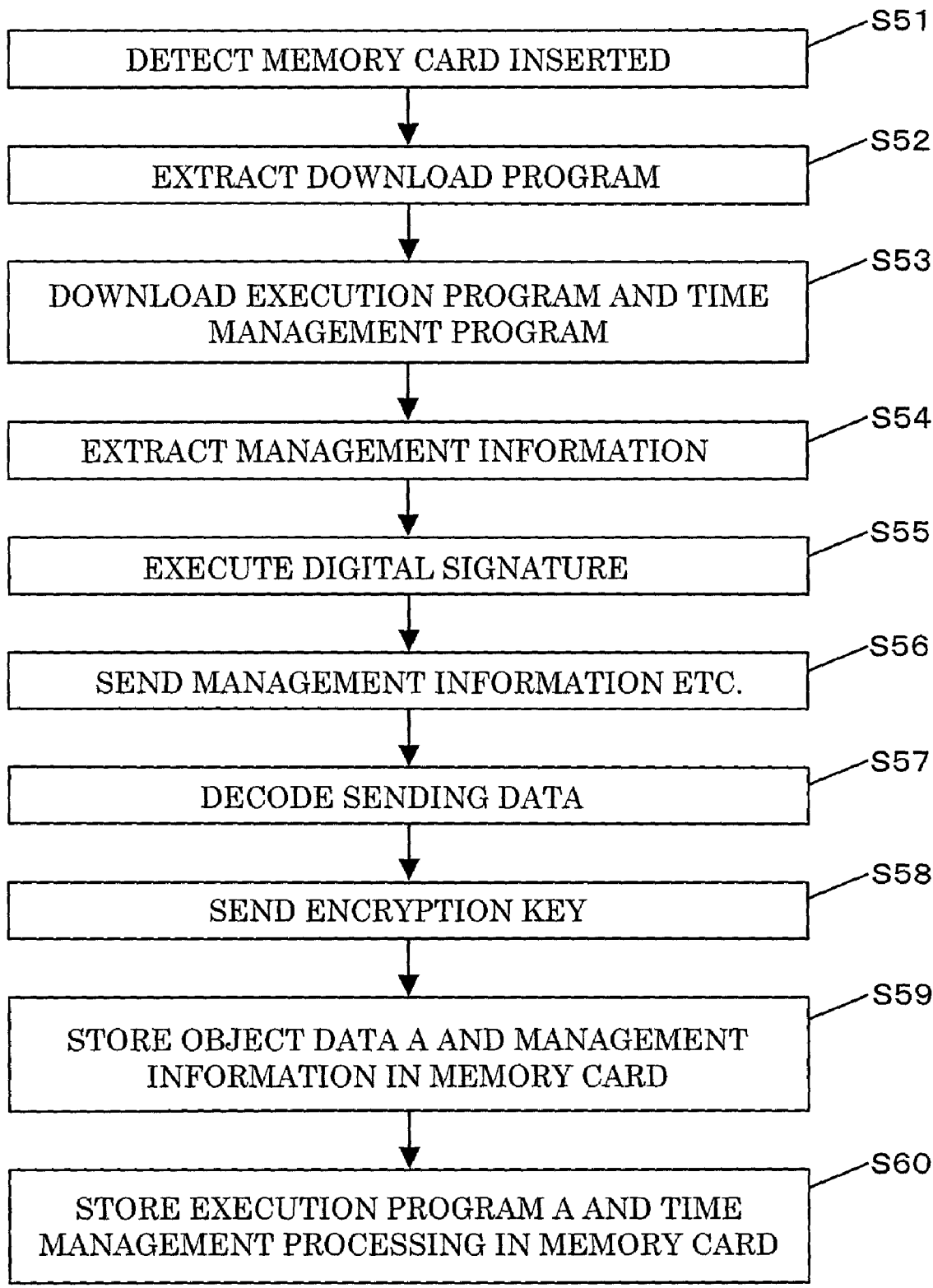
FIG. 10 is a first flow chart showing an operating procedure of the output time management system in Embodiment 3 of the present invention.
Figure 11:
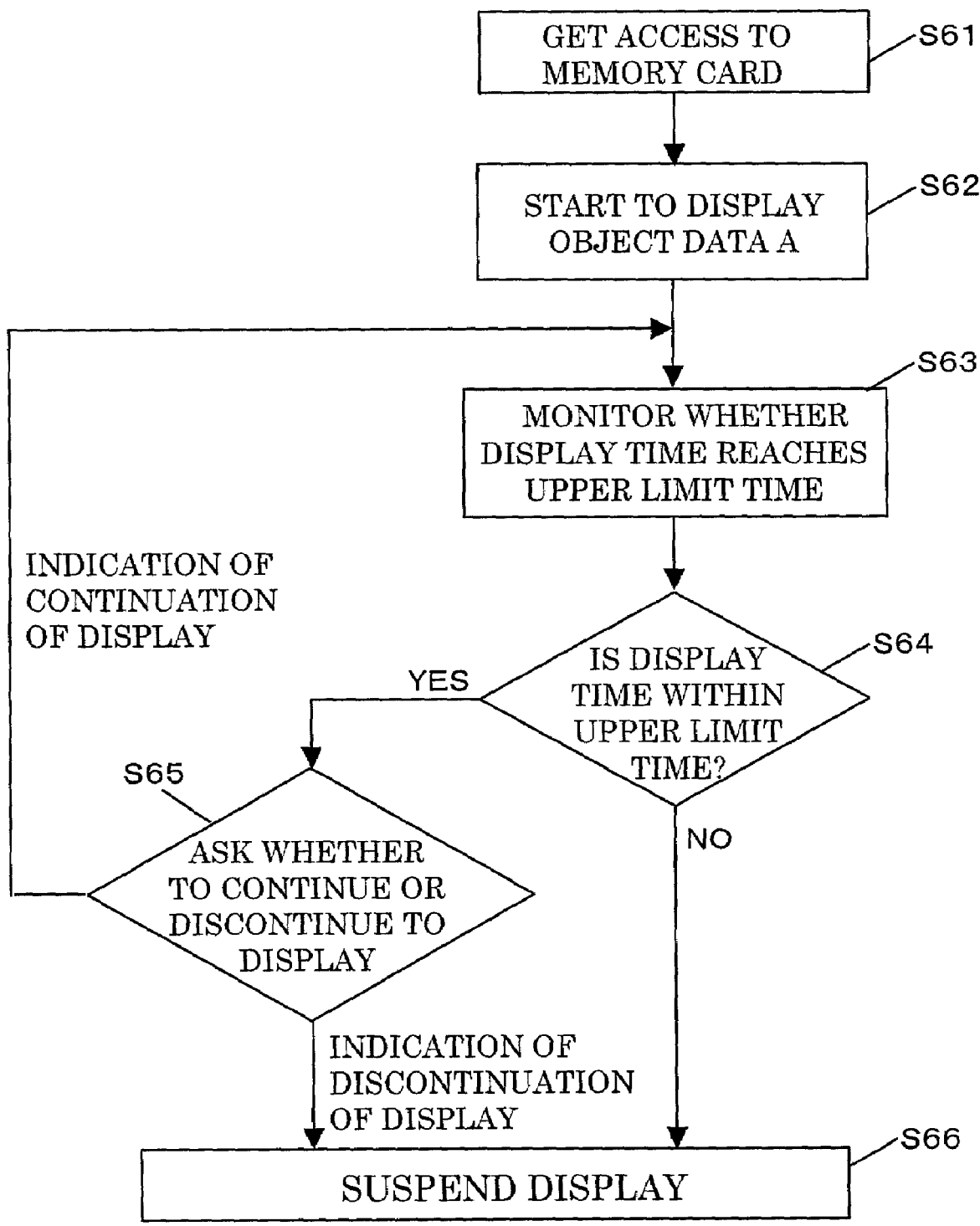
FIG. 11 is a second flow chart showing an operating procedure of the output time management system in Embodiment 3 of the present invention.

Then, the procedure in which digital duplicator 4 downloads the object data A distributed from server 1 as the distribution source and the object data A is stored in memory card 417 will be explained according to the flow charts in FIG. 10 and FIG. 11.

First, in digital duplicator 4, memory card controller 415 detects that memory card 417 is inserted (Step 51).

Next, LAN controller 407 receives sending data in which a download program is added to the encrypted object data A as explained in Embodiment 1 from server 1. Then, CPU 412 takes out a download program to download an execution program and time management program from the received sending data (Step 52).

And CPU 412 downloads the execution program and time management program from server 1 using the download program taken out (Step 53).

After that, CPU 412 generates a key pair of the public key encryption formula using the downloaded execution program, prepares a digital certificate of self-signature type and takes out the encrypted management information (its management information is the management information explained in Embodiment 1) from the object data A (Step 54).

And CPU 412 verifies a digital signature contained in the management information taken out, and if the verification results are correct, a digital signature is affixed on the encrypted management information, the user's name and self-signature digital certificate by secret key of the user's public key cryptograph (Step 55).

And LAN controller 407 sends the encrypted management information, the user's name, self-signature digital certificate and digital signature prepared by CPU 412 to server 1 (Step 56).

Then, in server 1, management means 108 verifies the digital signature in data sent from digital duplicator 4, and if the digital signature is correct, the part encrypted by public key of server 1 out of sending data is decoded by secret key of a public key cryptograph (Step 57).

Management means 108 inspects the decoded information as to validity date etc. and if the results are correct, management means 108 takes out an encryption key of an encrypted common key cryptograph in which the object data A is encrypted from key memory means 112.

Then, management means 108 encrypts the taken-out encryption key by public key taken out from the digital certificate of the user's self signature type and affixes a digital signature thereto, and communication means 101 sends the encryption key affixed with the digital signature and encrypted by the user's public key to digital duplicator 4 (Step 58).

Digital duplicator 4 decodes the received information by a secret key of the user's public key cryptograph and verifies the digital signature.

And memory card controller 415 stores the encrypted management information and the object data A in memory card 417 (Step 59). Also, memory card controller 415 stores the execution program and the time management program in memory card 417 (Step 60). Thus, downloading and storage in memory card 417 of the object data A etc. end.

Next, there will be explained an instance in which memory card 417 with the object data A etc. stored therein as described above is distributed to the client and in PC 21 the client sees the object data A stored in memory card 417.

Now, when seeing the object data A stored in memory card 417 in PC 21, the client inserts the memory card 417 in memory card slot 311 of PC 21.

Then, memory card controller 310 detects that the memory card 417 is inserted in the memory card slot 311, and gets access to memory card 417 (Step 61).

And management means 204 reads and decodes the encrypted object data A using the execution program stored in the memory card 417. Also, management means 204 takes out the management information embedded in the memory card 417 using the execution program stored in the memory card 417. And management means 204 stores a information on upper limit time (upper limit time information) B for which the display of the object data A is permitted in time information memory 212; the upper limit time information B is included in the management information.

Meanwhile, if the encrypted object data A as mentioned above is decoded, the object data A starts to be displayed on the screen of CRT 207 (Step 62). At the same time as the object data A starts to be displayed on the screen of CRT 207, controller 205 activates the time management program. On the basis of the time management program, time counter 208 starts to count the time for which the object data A is displayed on CRT 207 utilizing the time to be counted by timer 209. At the same time, comparator 210 starts to compare the upper limit time and the accumulation time measured by time counter 208, and controller 205 monitors whether the accumulation time measured by time counter 208 reaches the upper limit time (Step 63).

If the comparison by the comparator 210 indicates that the accumulation time measured by time counter 208 is within the upper limit time (Step 64), controller 205 lets the display of the object data A on CRT 207 continue, and displays a message on the display screen of CRT 207 asking the user to choose whether to continue or discontinue the display of the object data A on CRT 207 (Step 65). If, to the message, the user chooses to discontinue the display and operates PC 21 accordingly, controller 205 suspends the display of the object data A on CRT 207 (Step 66), and time counter 208 ends measuring the time for which the object data A is displayed on the CRT 207. Furthermore, comparator 210 deducts the accumulation time measured by time counter 208 from the upper limit time and renews the upper limit time. If, on the other hand, the user chooses to continue the display or does not choose either, controller 205 continues the display of the object data A on CRT 207, and the process returns to the step of monitoring whether the accumulation time measured by the time counter 208 reaches the upper limit time (Step 63).

On the other hand, if the comparison by comparator 210 finds that the accumulation time measured by time counter 208 reaches the upper limit time (Step 64), controller 205 forcibly suspends the display of the object data A on CRT 207 (Step 66). At the same time, controller 205 erases the object data A from the memory card 417.

As described above, according to the output time management system in Embodiment 3, even if the object data A is stored in the memory card 417, the display time of the object data A can be limited. As a result, even if a third party with no title can restore the object data A by some means, the copyright can be protected more strictly than before by limiting the display time of the object data A.

In Embodiment 3, memory card 417 is used as an example of removable storage medium. The same results can be obtained as when memory card 417 is used if floppy disk, optical disk, removable hard disk etc. are used as a removable storage medium.

Also in Embodiment 3, the object data A is stored in memory card 417 in digital duplicator 4, the object data A may be stored on memory card 417 by server 1.

In the following, an instance in which the object data A is stored in memory card 417 will be explained with reference to FIG. 12.

Now, the contents distributor inserts memory card 417 in memory card slot 216 of server 1.

Then, memory card controller 217 detects that memory card 417 is inserted (Step 71).

And encryption means 104 encrypts the object data A (Step 72), and furthermore encrypts the management information of the object data A by public key information of server 1.

After that, embedding means 105 embeds the management information in the object data A by digital watermark method (Step 73).

Then, memory card controller 217 stores the object data A with the management information embedded in it in memory card 417 (Step 74), and stores the execution program in memory card 417. Furthermore, memory card controller 217 stores the time management program in memory card 417 and ends the storing of object data A etc. in memory card 417.

Next, the arrangements of films to be stored in memory card 417 will be explained with reference to FIG. 13 to FIG. 17.

Figure 13:
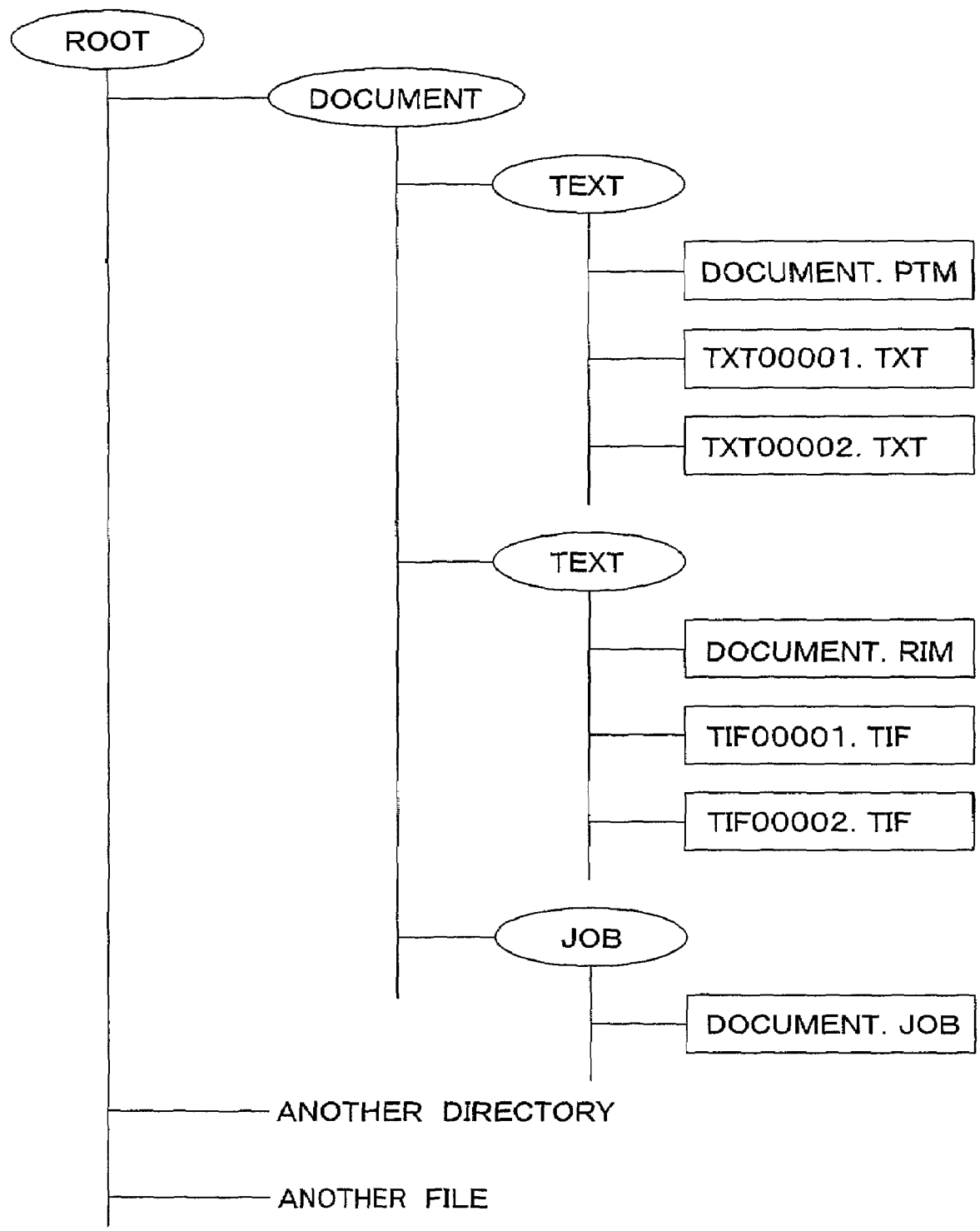
FIG. 13 is a diagram showing arrangement of a directory of data and data file stored in the memory card.

FIG. 13 is a diagram showing the arrangements of directories and films to be stored in memory card 417.

Figure 12:
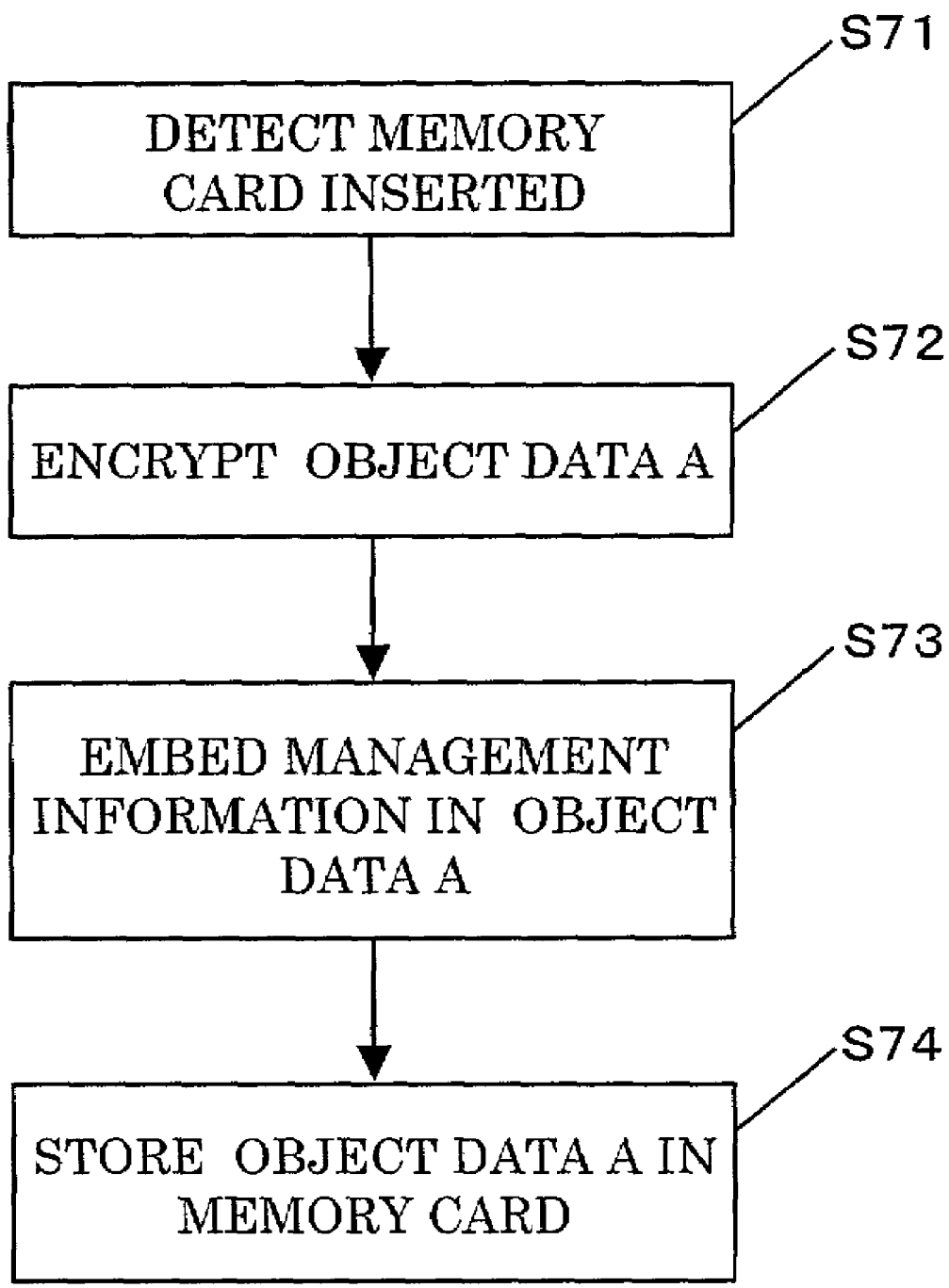
FIG. 12 is a third flow chart showing an operating procedure of the output time management system in Embodiment 3 of the present invention.

In FIG. 12, under a root directory (ROOT) are directory DOCUMENT, and under there are all files according to the present embodiment. Under directory DOCUMENT are directories for text data file (TEXT), directories for multipage image data file (RAS TER) and directories for job file (JOB).

The directory for text data file (TEXT) includes a plurality of data files TXT00001. TXT, TXT00002. TXT . . . and a text manager file DOCUMENT. PTM (Plain Text Manager) to manage each of a plurality of data. It is noted that the figure part of data file name is a file number.

Figure 14:
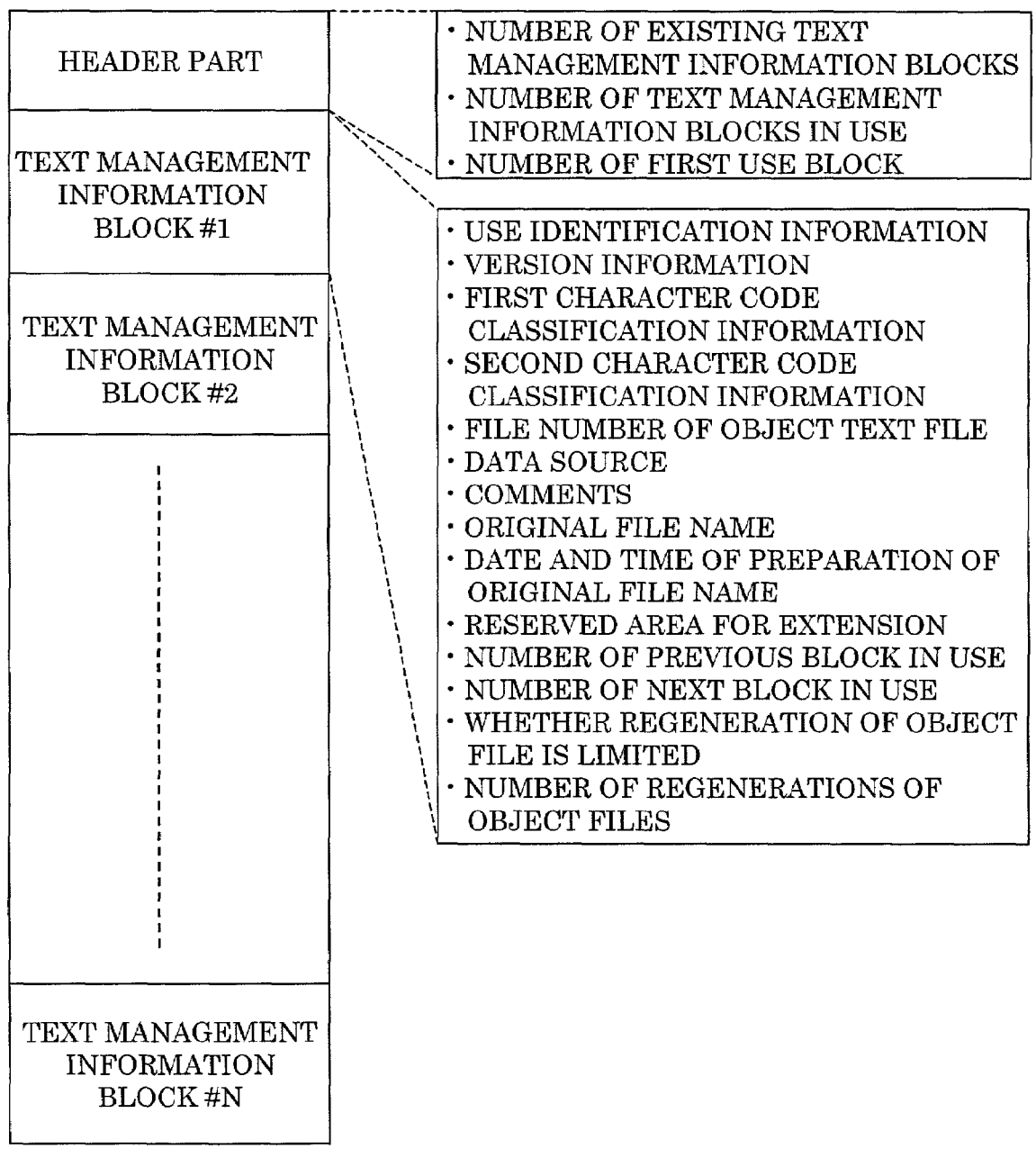
FIG. 14 is a diagram showing the file arrangement of text management file DOCUMENT. PTM.

FIG. 14 shows a file arrangement text manager file DOCUMENT. PTM.

In FIG. 14, text manager file DOCUMENT. PTM is formed of an essential header part having a fixed size and a plurality of text management information blocks #1 to #n (#1 to #n represent block numbers) having the respective fixed sizes that can be freely added or erased.

The header part contains the following information:
Number of text management information blocks present in the text manager file
number of the text management information blocks now in use out of those blocks
First use block number showing the first text management information block in use
Each text management information block contains the following information.
Block use identification information on text management information block indicating whether the block is now in use or not as against whether a text data file, an object of text management information, is present or not.
Version information on the format of text management information
First character code classification information on character data which is used in the text data file
Second character code classification information of character data which is used in text management information block
File number of object text data file
Data sources such as sent mail, received mail, address book etc.
Comments on text data file
Original file name before text data file is replaced with the above-mentioned TXTxxxx. TXT (xxxxx indicates a file number)
Date and time of preparation of the original file
Reserved area for extension
Previous text management information block number of the block in use (in case there is no previous text management information block, 0)
Next text management information block number of the block in use (in case there is no next text management information block, 0)
Whether there is a limit to regeneration of object text data file
Number of regenerations of object text data file In the text manager file formed that way, text data files and text management information corresponding to them can be stored efficiently by using the first use block number contained in the header part, the text management information block use identification information contained in the respective text management information blocks #1 to #n, previous block number in use, and next block number in use. An instance where text data file is added will be explained with reference to FIG. 15.

FIG. 15A and FIG. 15B are diagrams schematically showing text manager file and object text file before and after text data files are added. In FIG. 15, in a certain text management information block, the next text management information block number in use is indicated by an arrow with solid line and the previous text management information block number in use is indicated by an arrow with broken line.

As shown in FIG. 15A, first, in the header part, the number of the first block in use is indicated in #1, and therefore if #3, the number of the block next to management information block #1, is referred to, it is found that text management information block #2 between text management information blocks #1 and #3 is not used.

Next, in text management information block #2, as shown in FIG. 15B, use identification information is changed from "not in use" to "in use," and the number of the previous block in use is set to "#3" and the number of the next block in use is set to "#0." After that, the number of the next block in use in text management information block #3 is changed from "#0" to "#2."

Next, after the number of the text management information blocks in use in the header part is given addition of 1, the text data file is stored with file name TXT00002. TXT.

As shown, if the number of the previous block in use and the number of the next block in use are included in each text management information block, a file structure having a two-way list structure can be built, and it is possible to store text data files and text management information corresponding to them in memory card 417 with efficiency.

Therefore, if contents data (the object data A) is text data, it is possible to see the contents off-line after the text data file, text management information corresponding to the file, and time management program are stored in memory card in connection with each of them.

The directory for multi-page image data file (RASTER) shown in FIG. 13 contains a plurality of multi-page image data file TIF00001. TIF, TIF00002. TIF . . . and one image manager file DOCUMENT. RIM (Raster Image Manager) to manage each of them. As format of multi-page image file, Adobe's TIFF (Tag Image File Format) which is generally used is used.

Figure 16:
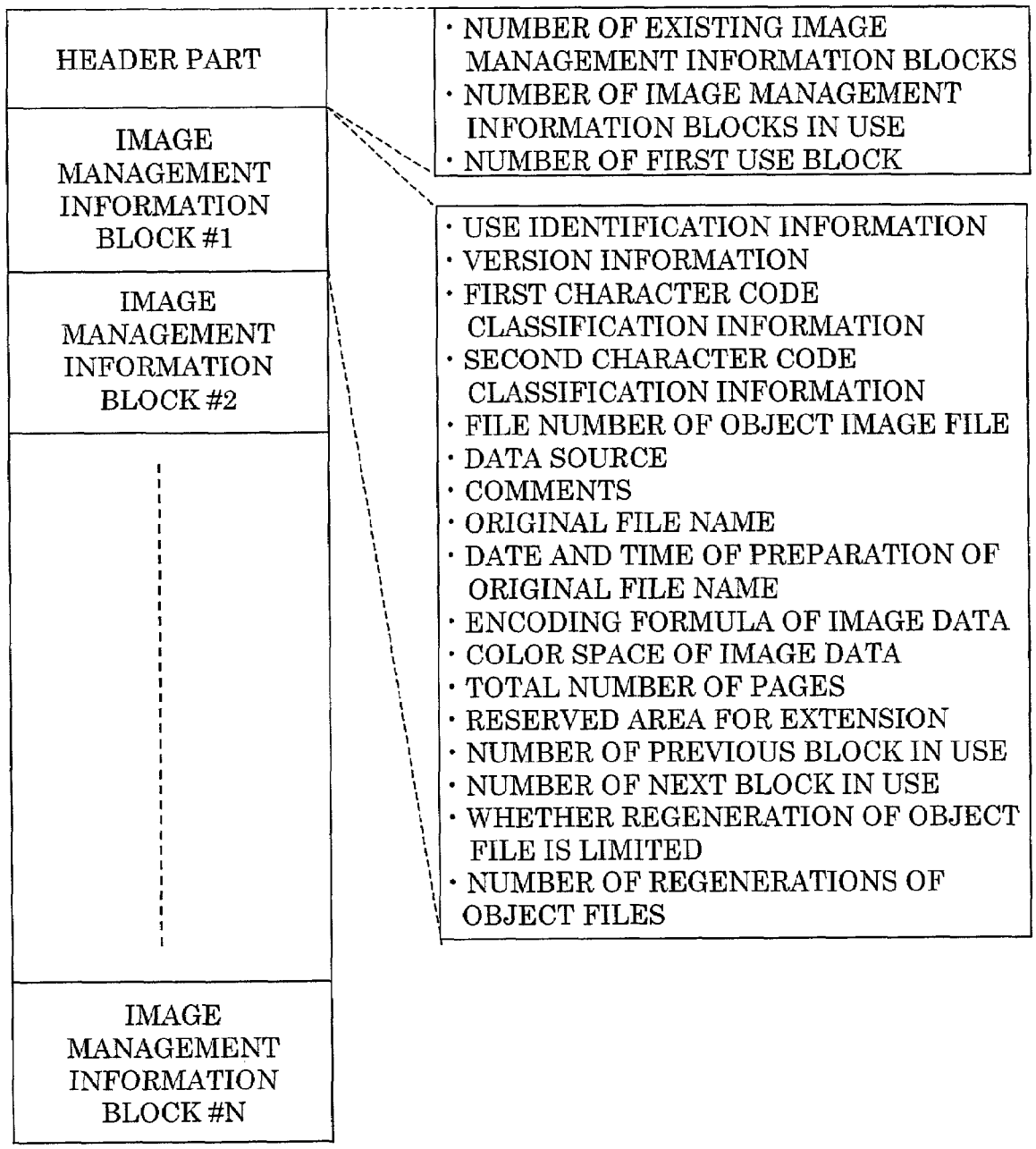
FIG. 16 is a diagram showing a file arrangement of image manager file DOCUMENT. RIM.

FIG. 16 shows the file structure of image manager file DOCUMENT. RIM.

In FIG. 16, the image manager file DOCUMENT. RIM is formed of an essential header part having a fixed size and a plurality of image management information blocks #1 to #n (#1 to #n represent block numbers), each having fixed size, which can be freely added and erased.

The header part contains the following information.
Number of image control management information blocks present in image manager file
Number of image control management information blocks in use out of those blocks
Number of the first use block showing the first image management information block in use Each image management information block contains the following information.
Image management information block use identification information indicating whether a block is in use or not as against whether a multi-page data file, an object of image management information, is present or not.
Version information on format of the image management information
First character code classification information on character data used in multi-page image data file
Second character code classification information on character data used in image management information block
File number of object multi-page image data file
Data source such as PC, image scanner, FAX etc.
Comments on multi-page image data file
Original file name before multi-page image data file is replaced with the above-mentioned TIFxxxxx. TIF (xxxxx represents the file number)
Date and time of preparation of this original file name
Encoding systems such as JPEG, JBIG, MH etc. used in multi-page image data (the encoding system may be different from page to page, and it is possible to set a plurality of encoding systems)
Color space and color, black and white identification information such as YCbCr, La*b* etc. used in multi-page image data (color space may be different from page to page, and it is possible to set a plurality of color spaces)
Total number of pages of multi-page image data
Reserved area for extension
Number of previous image management information block in use (in case there is no previous image management information block, 0)
Number of next image management information block in use (in case there is no next image management information block, 0)
Whether there is a limit to regeneration of object multi-page image data file
Number of regenerations of object multi-page data files The image manager file has the same two-way list structure as the text manager file, too and it is obtained the same advantage.

Therefore, if contents data (the object data A) is image data, it is possible to see the image off-line after the image data file, image management information corresponding to the file, and time management program are stored in memory card in connection with each of them.

The directory for job file (JOB) shown in FIG. 13 contains one job file DOCUMENT. JOB to execute such processings as display, printing etc. for a plurality of text data files and a plurality of multi-page data files.

Figure 17:
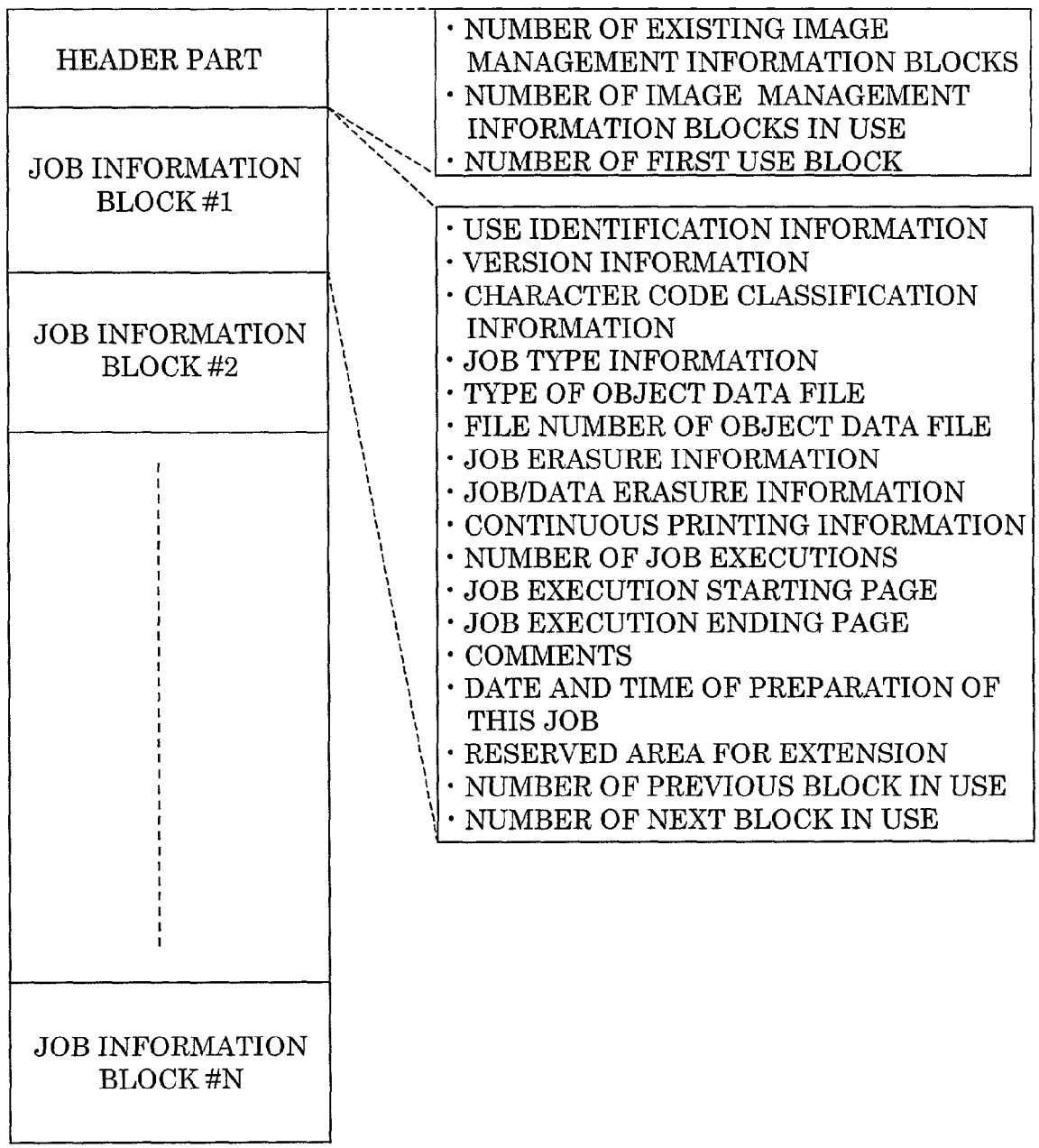
FIG. 17 is a diagram showing a file arrangement of job file DOCUMENT. JOB.

FIG. 17 shows the file structure of job file DOCUMENT. JOB. In FIG. 17, the job file DOCUMENT. JOB is formed of an essential header part having a fixed size, and a plurality of job information blocks #1 to #n (#1 to #n represent block numbers) having fixed sizes respectively that can be freely added or erased.

The header part of the job file contains the following information
Number of job information blocks present in the job file
Number of job information blocks in use out of those blocks
First use block number showing the first job information block in use Each job information block contains the following information
Job information block use identification information indicating whether a job information block is in use or not.
Version information concerning the format of job information
Character code classification information on character data used in job file
Job type information showing the type of job to execute such as display and print etc.
Type of object data file as to whether the object of job is text data file or multi-page image data file
File number of object data file of job
Job erasure information indicating whether to erase a job after the job is normally executed Job/data erasure information indicating whether to erase both job information and object data file after the job is normally executed Printing continuation information indicating whether to print text data of a small data like E-mail etc. in the printing job for this time continuously on the recording paper on which text data of a small data size such as E-mail etc. in the previous printing job is printed Number of job executions such as a plurality of prints Job execution starting page and job execution ending page valid only on multi-page image data file Comments on job Date and time of preparation of this job Reserved area for extension Number of previous job information block in use (in case there is no previous job information block, 0)

Number of next job information block in use (in case there is no job information block, 0)

The job file has a two-way list structure like the text and image manager file. That makes it easy to add and erase a job in particular.

Therefore, the client can see contents data (the object data A) stored in memory card 417 and contents management information and time management program, and when a seeing limit time comes, the contents data file is forcibly closed by the time management program and then the job file and original data are both erased as necessary. If it is necessary that an answer is written to the contents data and its contents data is returned to the distribution source, the contents data is forcibly closed, and then renewal data is overwritten on the original data and the job file alone is erased.

Digital duplicator 4 can be used as facsimile sending server. In that case, outside devices such as PC 21 send the telephone number of the destination and image data to digital duplicator 4 via network 3. Then, in digital duplicator 4, CPU 412 let compression decompression circuit 413 compress the image data received from the outside devices via network 3 as necessary.

CCU 409 sends the image data MH compressed by compression decompression circuit 413 to an outside facsimile apparatus by using public circuit using modem 414.

It is possible that digital duplicator 4 and the outside device can be connected to each other one-to-one using parallel I/F 408. In that case, the user can control digital duplicator 4 from PC 21. The user can set copying modes such as the number of pieces of paper to be copied, number of copies, paper size, copying density, enlargement ratio, two-side copying, sorting method etc. by executing control software to control dedicated digital duplicator 4 on PC 21 connected to digital duplicator 4. Furthermore, the user can set frame erasing and trimming area, and also can do complicated editing such as reversing negative/positive, area setting etc. using the display and the mouse.

In digital duplicator 4, furthermore, image data received by facsimile is decompressed by compression decompression circuit 413, transferred to page memory 411 and outputted by printing. In addition, the original image data read for sending by facsimile is stored in page memory 411, compressed by compression decompression circuit 413 and sent to an outside facsimile apparatus via CCU 409 and modem 414.

Memory card controller 415 controls access from CPU 412 to memory card 417 mounted on memory card controller 416. If a data file, an object of printing, is present in memory card 417 mounted on memory card controller 416, digital duplicator 4 can print data in the data file, an object of printing.

The operating section of digital duplicator 4 is provided with control panel 420A, and the control panel 420A is provided with liquid crystal display 420B with a touch panel, start button 420C for copying and other kinds of processings, stop button 420D, pose button 420E, and input button 420F such as ten keys.

And when downloading the object data A from server 1 using digital duplicator 4, the client downloads data and stores data in memory card 417 through control panel 420A.

In the embodiments just described, digital duplicator 4 is used as an example of the storing apparatus. Any storing apparatus will do as long as it has a function of storing at least the object data A and the upper limit time information B on a storing medium, and the present invention is not limited to the digital duplicator 4.

Furthermore, a program which makes a computer operate as the whole or part of the constituents of the output time management system in Embodiments 1, 2 and 3 can be applied to a specific computer. And on the computer, it is possible to materialize the function of the whole or part of the constituents of the output time management system in Embodiments 1, 2 and 3. The concrete examples of the embodiments in which the program is used include storing the program on storing media such as CD-ROM etc., transferring as by selling the storing media on which the program is stored and communicating the program by communication means in the Internet etc. Furthermore, installing the program in the computer is included in the embodiments of using the program.

As is evident from what has been described, the present invention can provide an output time management apparatus, an output time management system, and an output time management method which control the output of a object data on the basis of an accumulation time for which the object data is outputted by an output means to limit the time for which the object data is outputted. And the present invention can provide a program to control the output of the object data.

Furthermore, if the present invention is used, it will be possible to set utilization fees of the object data according to the output limit time of the object data. In addition, it will be possible to strictly protect the copyright of the object data by automatically erasing the object data as necessary.

According to the present invention, furthermore, even if the object data is a question in correspondence course of education, it is possible to distribute a question by setting the reading limit time according to the answering ability of the client, to manage the time it takes the client to answer, to write down an answer and store it and automatically send it back to the distribution source.

According to the present invention, furthermore, even when the object data is distributed by removable storage media such as memory card, it is possible to materialize the output time control of the object data and strong copyright protection of the object data.

What is claimed is:

1. An output time management apparatus comprising:
   an output time management means for acquiring a specific object data, a time management program for controlling an output of said specific object data, and an upper limit time for which the output of said object data is permitted, from data stored in a removable storing medium,
   a time counter for measuring an accumulation time representing the time elapsed from start of outputting the specific object data from the output time management apparatus,
   a comparator for comparing said upper limit time for said specific object data and said accumulation time for said object data measured by said time counter, and a controller for, executing said time management program acquired by said output time management means and outputting said specific object data based on said time management program, and after the comparison by said comparator, suspending the output of said specific object data when it is found that said accumulation time reaches said upper limit time.

2. The output time management apparatus of claim 1 wherein said output of said specific object data is for displaying said specific object data.

3. The output time management apparatus of claim 1 wherein said output of said specific object data is for outputting said specific object data by sound.

4. The output time management apparatus of claim 1 which further comprises a timer to count time, and
wherein said time counter measures said accumulation time utilizing the time counted by said timer.

5. The output time management apparatus of claim 1 which further comprises time information acquisition means for acquiring time information from an outside apparatus connected to the output time management apparatus and having the time information, and
wherein said time counter measures said accumulation time by utilizing the time information acquired by said time information acquisition means.

6. An output time management system comprising:
a data sending apparatus for sending data via a network,
a data receiving apparatus for receiving said data sent from said data sending apparatus,
an output time management means for acquiring a specific object data, a time management program for controlling an output of said specific object data, and an upper limit time for which the output of said object data is permitted, from said data received by said data receiving apparatus,
an output apparatus for outputting said specific object data based on said data received by said data receiving apparatus,
a time counting apparatus for measuring an accumulation time representing the time elapsed from start of outputting said specific object data by said output apparatus,
a comparison apparatus for comparing said upper limit time for said specific object data is permitted and said accumulation time for said specific object data measured by said time counting apparatus, and
a control apparatus for executing said time management program acquired by said output time management means and outputting said specific object data based on said time management program, and after the comparison by said comparator, suspending the output of said specific object data when it is found that said accumulation time reaches said upper limit time.

7. An output time management system comprising:
a storing apparatus for storing data on a storing medium,
a reading apparatus for reading data from said storing medium,
an output time management means for acquiring a specific object data, a time management program for controlling an output of said specific object data, and an upper limit time for which the output of said specific object data is permitted, from said data read by said reading apparatus,
an output apparatus for outputting said specific object data based on said data read by said reading apparatus,
a time counting apparatus for measuring an accumulation time representing the time elapsed from start of outputting said specific object data by said output apparatus,
a comparison apparatus for comparing said upper limit time for specific object data and said accumulation time for said specific object data measured by said time counting apparatus, and
a control apparatus for executing said time management program acquired by said output time management means and outputting said specific object data based on said time management program, and after the comparison by said comparator, suspending the output of said specific object data when it is found that said accumulation time reaches said upper limit time.

8. An output time management method comprising:
an output time management step for acquiring a specific object data, a time management program for controlling an output of said specific object data, and an upper limit time for which the output of said specific object data is permitted, from data stored in a removal storing medium,
a time counting step for measuring an accumulation time representing the time elapsed from start of outputting said specific object data by the output time management step,
a comparing step for comparing said upper limit time for said specific object data and said accumulation time for said specific object data measured in said time counting step, and
a controlling step for for executing said time management program acquired in said time management step and outputting said specific object data based on said time management program, and after the comparing step, suspending the output of said specific object data when it is found that said accumulation time reaches said upper limit time.

9. A computer readable storing medium for storing a program which makes a computer operate as an output time management apparatus, comprising:
an output time management step for acquiring a specific object data, a time management program for controlling an output of said of said specific object data, and an upper limit time for which the output of said specific object data is permitted, from data stored in a removal storing medium,
a time counting step for measuring an accumulation time representing the time elapsed from start of outputting said specific object data by said output time management step,
a comparing step for comparing said upper limit time for said specific object data and said accumulation time for said specific object data measured in said time counting step, and
a comparing step for for executing said time management program acquired in said time management step and outputting said specific object data based on said time management program, an after the comparing step, suspending the output of said specific object data when it is found that said accumulation time reaches said upper limit time.

* * * * *